United States Patent
Blum et al.

(10) Patent No.: US 9,477,215 B2
(45) Date of Patent: Oct. 25, 2016

(54) ANTHROPOMORPHIC CONTROL OF LIGHTING AND OTHER OUTPUT CONDITIONS

(71) Applicant: ABL IP HOLDING LLC, Conyers, GA (US)

(72) Inventors: Darren Blum, San Mateo, CA (US); Januk Aggarwal, Tysons Corner, VA (US); Aaron Engel-Hall, San Francisco, CA (US); John England, San Francisco, CA (US)

(73) Assignee: ABL IP HOLDING LLC, Conyers, GA (US)

( * ) Notice: Subject to any disclaimer, the term of this patent is extended or adjusted under 35 U.S.C. 154(b) by 381 days.

(21) Appl. No.: 14/252,431

(22) Filed: Apr. 14, 2014

(65) Prior Publication Data
US 2015/0293504 A1    Oct. 15, 2015

(51) Int. Cl.
*G06F 17/00* (2006.01)
*G05B 13/02* (2006.01)

(52) U.S. Cl.
CPC ................. *G05B 13/0265* (2013.01)

(58) Field of Classification Search
CPC ................................................ G05B 13/0265
USPC ......................................... 700/90–102
See application file for complete search history.

(56) References Cited

U.S. PATENT DOCUMENTS

| | | | | |
|---|---|---|---|---|
| 7,053,752 B2 * | 5/2006 | Wang | ...................... | A61B 17/00 340/3.54 |
| 2006/0229755 A1 * | 10/2006 | Kuiken | ................. | A61F 2/5046 700/98 |
| 2008/0058605 A1 * | 3/2008 | Sorensen | ................. | A61B 1/32 600/208 |
| 2011/0288964 A1 * | 11/2011 | Linder | .................... | B25J 9/1689 705/27.1 |
| 2014/0129004 A1 * | 5/2014 | Takayama | .............. | G05B 15/02 700/83 |

OTHER PUBLICATIONS

Nakanishi, Jun, et al. "Comparative experiments on task space control with redundancy resolution." Intelligent Robots and Systems, 2005.(IROS 2005). 2005 IEEE/RSJ International Conference on. IEEE, 2005. pp. 1-8.*
Kono, Yoshitomo, Shin-ichi Yamada, and Hideji Fujikawa. "Stabilization of an inverted flexible pendulum by fuzzy control." Industrial Electronics Society, 1998. IECON'98. Proceedings of the 24th Annual Conference of the IEEE. vol. 1. IEEE, 1998. pp. 34-39.*
Yousuf, Asad, et al. "Animatronics and emotional face displays of robots." (2003). pp. 1-14.*

* cited by examiner

*Primary Examiner* — Satish Rampuria
(74) *Attorney, Agent, or Firm* — RatnerPrestia

(57) ABSTRACT

An example of an intelligent lighting device or system is configured to control one or more parameters of light output, such as intensity, shape or distribution, color characteristics and position or orientation of light output (e.g. via a motorized luminaire control). The device or system may have other controllable output capability, e.g. display projection or audio. Sensors or other input devices are responsive to the user. Responsive to user input, the device or system, controls its light and any other output capabilities so as to present a defined persona to the user or other occupant(s) of a space illuminated by the intelligent lighting device or system.

23 Claims, 9 Drawing Sheets

# ANTHROPOMORPHIC CONTROL OF LIGHTING AND OTHER OUTPUT CONDITIONS

TECHNICAL FIELD

The present subject matter relates to techniques and equipment to provide anthropomorphic control of lighting and other output conditions of or controlled through a lighting device or system. Such anthropomorphic control may define and be based on a persona having one or more characteristics that are learned over time and based on user interaction.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb and inanimate objects, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, solid state sources are now becoming a commercially viable alternative to traditional light sources such as incandescent and fluorescent lamps. By nature, solid state light sources such as light emitting diodes (LEDs) are easily controlled by electronic logic circuits or processors. Electronic controls have also been developed for other types of light sources. As increased processing capacity finds its way into the lighting devices, it becomes relatively easy to incorporate associated communications capabilities, e.g. to allow lighting devices to communicate with system control elements and/or with each other. In this way, advanced electronics in the lighting devices as well as the associated control elements have facilitated more sophisticated lighting control algorithms as well as increased networking of lighting devices.

However, there have also been proposals to further enhance lighting controls. For example, it has been proposed that a lighting device may include a sensor and processing capability to detect gestural inputs from a user. If the sensor detects touch, the user must approach the device or an associated control panel and contact the touch sensor in an appropriate manner to input a gesture corresponding to the user's desired control of the light. More recent developments in gestural sensing technologies eliminate the need for actual touching, but such devices still typically require that the user make the appropriate gesture in fairly close proximity to the sensor on the device or at the control panel.

There have also been efforts to develop speech-command responsive control of lighting, using advanced speech recognition technologies.

In a somewhat related field a variety of entities are proposing controls for lighting and other functions in a building from a variety of portable user devices, for example, from remote controls or from mobile devices such as smartphones or tablet computers.

SUMMARY

Despite such recent efforts, there is still room for further improvement in anthropomorphic control of lighting and other output conditions to reflect a persona of the lighting system to the occupant as well as the ability to learn and adjust that persona based on past and current user interaction.

A first example of a system described in detail below includes a source of light, at least one other controllable feature, a sensor, a storage device, an anthropomorphic object related to a persona and a processor. In the system example, the source of light outputs visible light responsive to control by the processor, and the other controllable feature provides a humanly perceptible output responsive to control of the processor. The sensor is configured to detect a condition in a space illuminated by the system related to an activity of an occupant of the space and the sensor provides a condition responsive input to the processor.

The storage device in the first system example contains a program that, when executed by the processor, configures the system to control operation of the light source and control operation of the other controllable feature. Execution of the program by the processor also configures the system to process the condition responsive input to determine an activity of the occupant of the space and manipulate the controlled operations based on the anthropomorphic object such that the light source and at least one other controllable feature provide a presentation for the occupant as a perceptible instance of the persona.

Another example of a system described in detail below includes a source of light, at least one other controllable feature, a sensor, a data communication interface, a storage device, an anthropomorphic object related to a persona and a processor. In this system example, the source of light outputs visible light responsive to control by the processor, the other controllable feature provides a humanly perceptible output responsive to control of the processor, and the data communication interface is controlled by the processor. The sensor is configured to detect a condition in a space illuminated by the system related to an activity of an occupant of the space and the sensor provides a condition responsive input to the processor.

The storage device in this system example contains a program that, when executed by the processor, configures the system to identify the occupant, retrieve a profile of the identified occupant including modifications to the anthropomorphic object, control operation of the light source, and control operation of the other controllable feature. Execution of the program by the processor also configures the system to process the condition responsive input to determine an activity of the occupant of the space and manipulate the controlled operations such that the light source and the other controllable feature provide a presentation for the occupant as a perceptible instance of the persona.

Still another example of a system described in detail below includes a source of light, at least one other controllable feature, a sensor, a user input element, a storage device, an anthropomorphic object related to a persona and a processor. In this system example, the source of light outputs visible light responsive to control by the processor and the other controllable feature provides a humanly perceptible output responsive to control of the processor. The sensor is configured to detect a condition in a space illuminated by the system related to an activity of an occupant of the space, the sensor provides a condition responsive input to the processor and the user input element allows for providing user input for processing to the processor.

The storage device in this system example contains a program that, when executed by the processor, configures the system to control operation of the light source and control operation of the other controllable feature. Execution of the program by the processor also configures the system to receive input from the user input element representing a desired change of the visible light output and/or from the sensor representing an activity status of the occupant while in the space based upon the condition responsive input to the processor. In response to the received input, the processor manipulates the controlled operations such that the light source and the other controllable feature provide a presentation for the occupant as a perceptible instance of the persona.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
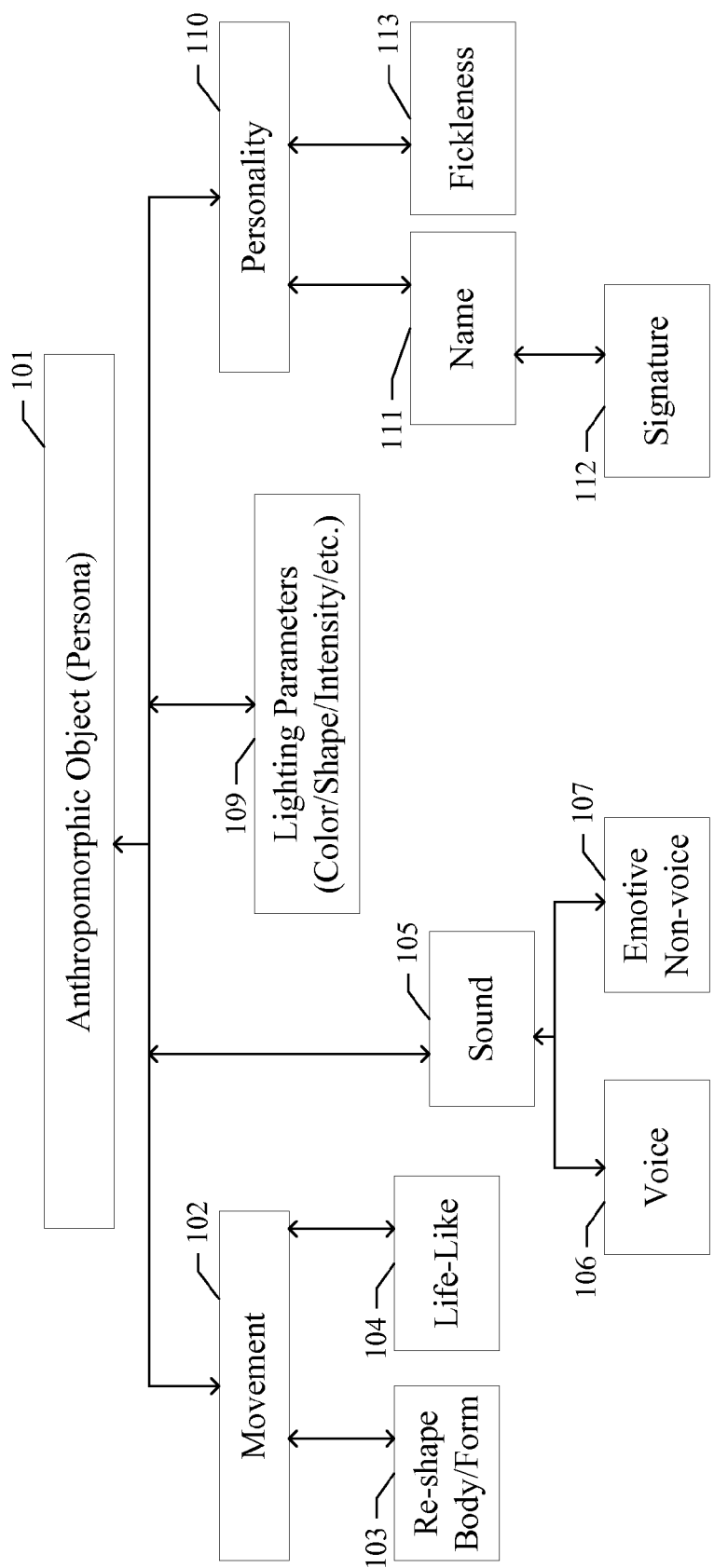
FIG. 1 is a block diagram of an example of characteristics of a persona embodied by an anthropomorphic object.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As lighting devices incorporate more intelligence, people are beginning to add more functionality, such as more sophisticated user interactivity. The world is becoming interconnected. The trend in technologies that control lighting is toward an "Internet of things" in which more and more machines are interconnected to communicate with each other and interact with the users via the Internet. However, those interconnected machines still only respond to such user interaction via preprogrammed or otherwise programmatic and/or stylized responses.

Although advanced processor-controlled lighting equipment may offer sophisticated control algorithms in response to various user inputs, even such equipment delivers lighting services in a relatively lifeless or inanimate manner. For lighting, the lighting devices and controllers typically respond to user interaction simply by implementing the desired change. For example, when a lighting device with an occupancy sensor detects an occupant entering a room or other space, the lighting device controls a light source to begin illumination of that room or other space. Similarly, when the occupancy sensor detects that the occupant has left the room, the lighting device controls the light source to stop illuminating the room.

To improve the user experience and provide a more personalized and engaging user interface, the various examples of a lighting system discussed below and shown in the drawings offer an anthropomorphic control of lighting and other output conditions to reflect a persona of the lighting system to the occupant. Stated another way, the lighting system may take on a personality of its own and present such personality in a perceptible way to an occupant.

Furthermore, the various examples of a lighting system discussed below and shown in the drawings offer modification of the lighting system's persona based on user activity and user conditions. That is, not only does the lighting system present a persona to an occupant, but the lighting system may also develop or change that persona over time and personalize the persona to a particular occupant based on determined user activity. Thus, the lighting system may learn how an occupant responds to the persona and utilize such learning to change the persona.

Reference now is made in detail to the examples illustrated in the accompanying drawings and discussed below.

FIG. 1 illustrates the elements and/or aspects of an example of a persona embodied by an anthropomorphic object. In general, a persona is the mask or façade presented to satisfy the demands of a situation or environment. A persona may also be considered the perceived or evident personality of an individual. Furthermore, anthropomorphic is an adjective for ascribing human form or attributes to a being or thing not human. Thus, the examples herein describe techniques for displaying a persona via a system, such as a lighting system and/or lighting device. Such persona is defined, for example, by an anthropomorphic object or data set that includes various settings related to characteristics of a persona and corresponding values for each characteristics.

The persona is displayed, for example, via anthropomorphic control (i.e., changing physical characteristics) of an item or items, such as output(s) of a lighting system and/or lighting device, based on the anthropomorphic object. In one such example, described in greater detail below, a lighting device displays a persona by "welcoming" an occupant into a room or other space by "waving" a light source and announcing "good morning" or some other time appropriate greeting through a speaker.

In the example of FIG. 1, an anthropomorphic object 101 embodying a persona is defined based on various characteristics including movement 102, sound 105, lighting parameters 109 and personality 110. Although the example of FIG. 1 lists these four characteristics, this is not intended to be a complete list of characteristics that might be used to define the persona and more, fewer or different characteristics may be used to define the persona in anthropomorphic object 101. As discussed above, such characteristics are defined, for example, in the anthropomorphic object 101 as a set of parameters or variables along with corresponding settings or values for the characteristics intended to be presented by the persona. The anthropomorphic object 101, through these variables and corresponding values, thus describes how an item or items (i.e., basic operation of lighting device and/or lighting system) will change, through movement, sound, lighting, personality, etc., to present or display the defined persona to an occupant or occupants of a room or other space in response to activity related to the occupant(s) and operation of the lighting device and/or lighting system.

For example, movement 102 includes re-shaping a body or form 103 and life-like action 104. One example of re-shaping a body or form 103 is an extensible table lamp that re-shapes or changes to/from a fully retracted, a fully extended and/or some intermediate position. An example of life-like action 104 is the extensible table lamp that fully extends and fully retracts repeatedly in fairly quick succession as if "waving". In such an example, a lamp head of the device may pivot about two or more different axes, to give additional degrees of motion and direction of light output controllable in accordance with the persona. As can be seen in these examples, life-like action 104 may involve re-shaping a body or form 103 that results in an overall movement 102 that contributes to the display or presentation of a perceptible instance of the persona, as defined by anthropomorphic object 101.

Although movement 102 is one characteristic of a persona that contributes to the display or presentation for an occupant, such display or presentation need not be limited to a single characteristic. Sound 105, for example, is another characteristic of the persona that includes both voice 106 and emotive non-voice 107 elements. In the "waving" table lamp example, an anthropomorphic control may include utilizing voice 106 to pronounce a time-appropriate or other greeting, such as "good morning", while utilizing emotive non-voice sound 107 to provide corresponding time-appropriate or other music and/or other sound effects. The anthropomorphic object defines, for example, the voice 106 as masculine, feminine, or neuter as well as other attributes, such as timing, speed, dialect, and/or accent. The object may similarly define aspects of any non-voice sound outputs. In this way, the presentation incorporates aspects from the various characteristics (i.e., movement 102, sound 105, etc.) to display a persona to the occupant based on the anthropomorphic object 101.

Lighting parameters 109 are additional characteristics, for example, that contribute to the persona and are defined by the anthropomorphic object 101 in the example. Lighting parameters 109 include color, shape, intensity, distribution, state (ON/OFF), variation, and/or repetitions (e.g., chaotic, cyclical, flash rate, etc.). Color characteristics include correlated color temperature (CCT), color rendering index (CRI), spectral content, and/or relatively pure color (e.g., just red, green, or blue). Once again, in the "waving" lamp example, lighting parameters 109 are utilized to turn the light source of the lamp ON and, in one variation, set the CCT such that the light source resembles sunlight. In an alternate example, when the occupant leaves the room or other space, the lamp utilizes voice 106 to say "good bye" and utilizes lighting parameters 109 to turn the light source OFF.

Personality 110 is another characteristic that contributes to persona and may be defined by anthropomorphic object 101. While other characteristics generally relate to external attributes and/or conditions, personality 110 generally relates to internal attributes that further define the persona. Personality 110, for example, includes name 111 and signature 112 (as a representation of name 111) as well as fickleness 113. Name 111 defines a designation for the item to which the persona belongs and signature 112 provides a visible mark of such designation. Fickleness 113 loosely defines, for example, how an item to which the persona belongs responds to external events and how those responses change or remain constant over time. Returning to the "waving" lamp example yet again, anthropomorphic object 101 defines a name for the lamp as "Robert" and a signature as "Bob the Lamp". In the situation where an occupant has left the room or other space without turning the lamp off, the lamp, based on a persona defined by the anthropomorphic object 101, will send a reminder e-mail to the occupant that the lamp was left on. The e-mail, for example, includes a signature line "Bob the Lamp" indicating that the e-mail originated from the lamp. Furthermore, based on fickleness 113, if the current occurrence of the lamp being left on is yet one more of multiple repeated occurrences, the lamp's e-mail might include a statement of disdain or disgust for such negligence from "Robert". Thus, personality 110 influences the display of other characteristics (e.g., movement 102, sound 105, lighting parameters 109, etc.) in the presentation of a perceptible instance of the persona based on anthropomorphic object 101.

Although not shown, environmental parameters are another example of characteristics that may be controlled via a lighting system and that influence a persona as defined by anthropomorphic object 101. Environmental parameters include, for example, temperature, air flow and humidity as well as other parameters that influence occupants of a room or other space. Yet other examples of characteristics that influence a persona as defined by anthropomorphic object 101 include mood and level of activity (e.g., a processor is heavily engaged in distributed processing for an urgent task) as well as any number of other characteristics that may be quantified and defined as a variable with a corresponding value or range of values.

Thus, anthropomorphic object 101 defines a persona that modifies and/or enhances, for example, operations of a lighting device and/or lighting system. The persona may remain fairly static over time. In the examples, however, the persona changes over time by "learning".

Figure 2:
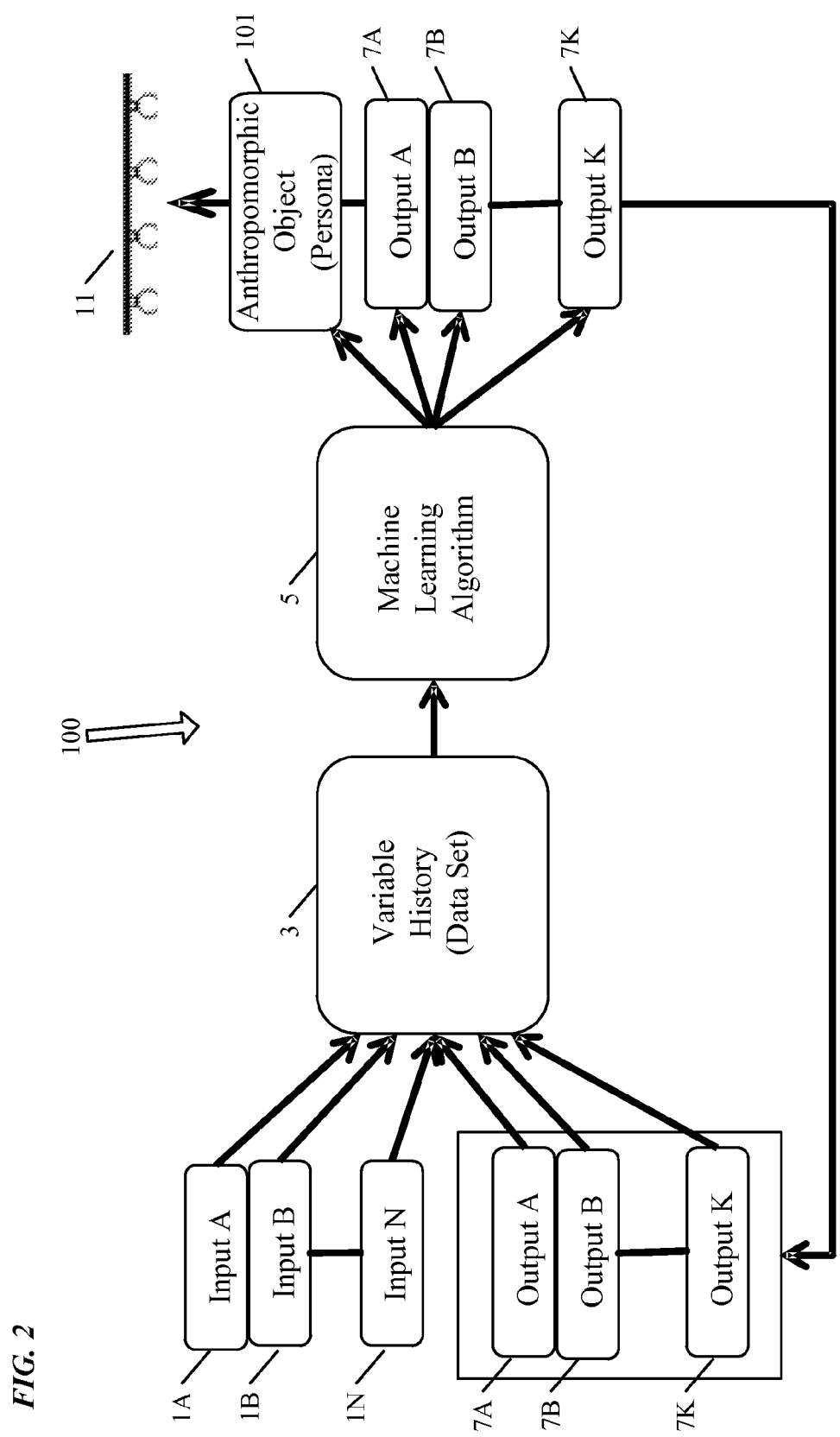
FIG. 2 is a simple example of a learning system with lighting control based on a range of inputs, including a range of previous outputs, historical data and a machine learning algorithm.

FIG. 2 illustrates a simple example of a learning system 100 that may be used to modify an anthropomorphic object 101 and manipulate control of an adjustable lighting device 11, such as one or more fixtures, lamps or other types of luminaires described in greater detail below. The learning system 100 receives various inputs 1A, 1B . . . 1N, including previously generated outputs 7A, 7B . . . 7K and generates the current outputs 7A, 7B . . . 7K as well as an anthropomorphic object 101 and/or modifications to the anthropomorphic object 101. These various inputs include, for example, user selectable options (i.e., direct user input) and sensed conditions (e.g., indirect user input based on user activity, other non-user activity, or other conditions such as time of day, temperature, weather conditions, etc.). Inputs may also include information obtained via external network communications, such as user inputs via a remote device or status or the like about a user occupant obtained from an on-line service. The outputs correspond to, for example, control signal(s) or command(s) for a variety of controllable light output parameters (e.g., ON/OFF, intensity (when ON) and various color-related characteristics) as well as movement, sound and/or other personality characteristics which may reflect a persona of lighting device 11 in response to the control signal(s) or command(s) from the system 100.

The learning system 100 includes a variable history 3, commonly referred to as a data set. The variable history (data set) 3 includes not only the currently received various inputs 1A, 1B, 1N and outputs 7A, 7B . . . 7K, but also all data for previously received inputs and outputs. For anthropomorphic control, the data set becomes part of or is linked to an anthropomorphic object 101 of a particular lighting device 11.

This variable history (data set) 3 is provided to a machine learning algorithm 5 which in turn generates the outputs 7A, 7B . . . 7K as well as the anthropomorphic object 101 and/or modifications to the anthropomorphic object 101. The machine learning algorithm 5 is, for example, a neural network that "learns" how to manipulate the various inputs, including previously generated outputs, in order to generate current outputs. As part of this "learning" process, the neural network calculates weights to be associated with the various inputs, including the previously generated outputs. The weights are then utilized by the neural network to manipulate the inputs, including the previously generated outputs, and generate the current outputs. Although FIG. 2 illustrates a simple example of the learning system 100, such learning system 100 may be more or less complex, including any number of inputs and outputs with a variable history (data set) 3 that may be filtered or otherwise controlled and any number of different learning algorithms 5. Hardware for receiving the inputs, storing the data set and running the learning algorithm to control the lighting device will be discussed later.

Figure 3:
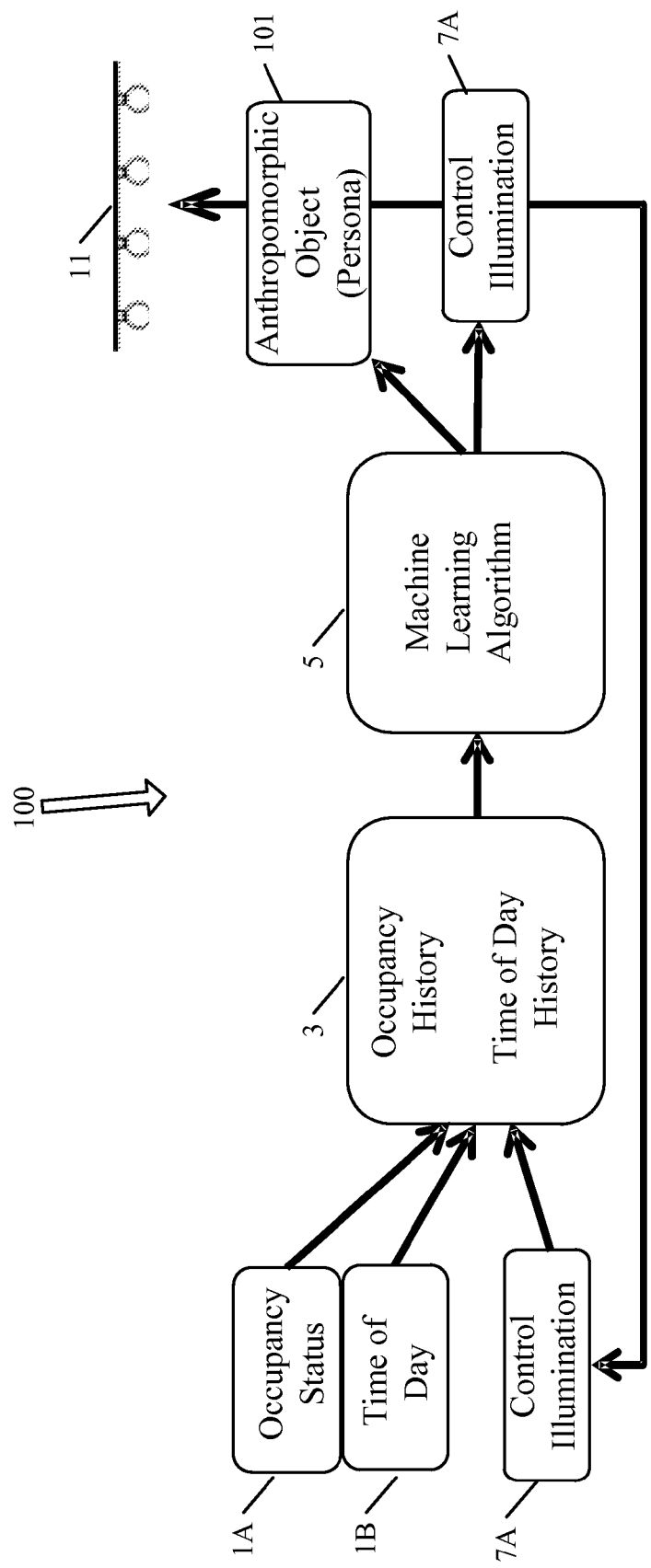
FIG. 3 is another example of the learning system of FIG. 2 with three inputs, including a previous output, historical data and a machine learning algorithm where the output controls a lighting function.

For simplicity, FIG. 3 is an example of the learning system 100 of FIG. 2 with three inputs (two inputs and a previous output) that generates one output as well as modifications to an existing anthropomorphic object 101. Although a variety of light output parameters may be controlled, the example of lighting device 11 in the discussions below is controlled to illuminate a room or other space upon detecting an occupant in the room or other space. In this example, input 1A is an occupancy status (e.g., status from an occupancy sensor). Input 1B is the time of day corresponding to the occupancy status. The output 7A is an illumination control value that will be applied to adjustable lighting device 11, based on the occupancy status and time of day. The lighting device 11, upon receipt of the illumination control value and based on anthropomorphic object 101 with modifications, manipulates controllable parameter(s) of the operation of lighting device 11, including to provide a presentation of a perceptible instance of a persona.

In the example of FIG. 3, the data set 3 includes all previous occupancy statuses as well as the time of day corresponding to each occupancy status. In addition, the data set 3 includes each corresponding illumination control value. The machine learning algorithm 5 takes the data set 3 and generates a current illumination control value 7A to be applied to adjustable lighting device 11.

In one example, the occupancy status indicates an occupant has just entered the room or other space and the time of day is 9:00 AM. The machine learning algorithm 5, based on data set 3, determines that the lighting device 11 should be controlled to enable illumination of the room or other space. In addition, anthropomorphic object 101 defines a persona that is "inviting" to occupants. Based on this "inviting" persona and the illumination control value, lighting device 11 is controlled to illuminate the space (e.g., set CCT to a value resembling sunlight) and a speaker is controlled to announce a time-appropriate greeting (e.g., good morning).

In another example, the occupancy status indicates an occupant is leaving the room or other space and the time of day is 5:00 PM. The machine learning algorithm 5, based on data set 3, determines that the lighting device 11 should be controlled to disable illumination of the room or other space. In addition, anthropomorphic object 101 defines a persona that is "gracious" of leaving occupants. Based on this "gracious" persona and the illumination control value, lighting device 11 is controlled to disable illumination (e.g., set lighting device 11 status to OFF) and a speaker is controlled to announce "good bye". The transition from ON to OFF may include a flicker, by way of a parting gesture.

As a further example, the occupant is an employee who prefers to begin work at 7:00 AM with dimmed lights to avoid distractions. Upon entering the room or other space and being greeted with bright lights and a loud welcome at 7:00 AM, the employee promptly dims the lights and turns the speaker volume down. Learning algorithm 5 takes this response as additional input and utilizes this additional input to modify future illumination control values. Learning algorithm 5 also utilizes this additional input to modify anthropomorphic object 101 such that the greeting is more muted and/or delayed, perhaps until 9:00 AM or at another time when other occupants begin entering the room or other space. Thus, when the employee returns to work the next day at 7:00 AM, lighting device 11 is controlled to illuminate the room or other space with a lower intensity and brightness while the speaker softly announces "morning".

In this way, the learning system 100 "learns" from current and previous statuses and responses by the user such that the learning system 100, for example, anticipates future lighting control functions. In addition, anthropomorphic object 101 also develops, based on this "learning", a persona for the lighting device 11. In some examples, such persona is also personalized to individual occupants, such as the early arriving employee of the previous example.

The anthropomorphic control and learning techniques like those outlined above may be implemented in or control a single lighting device or in a system controlling a few or a substantial number of lighting devices. Even a single standalone device, however, may be network connected if the device is intended to use remote data sources as one or more of the inputs. For discussion purposes, however, we will next consider a system of devices that provides lighting services throughout a premises.

Figure 4A:
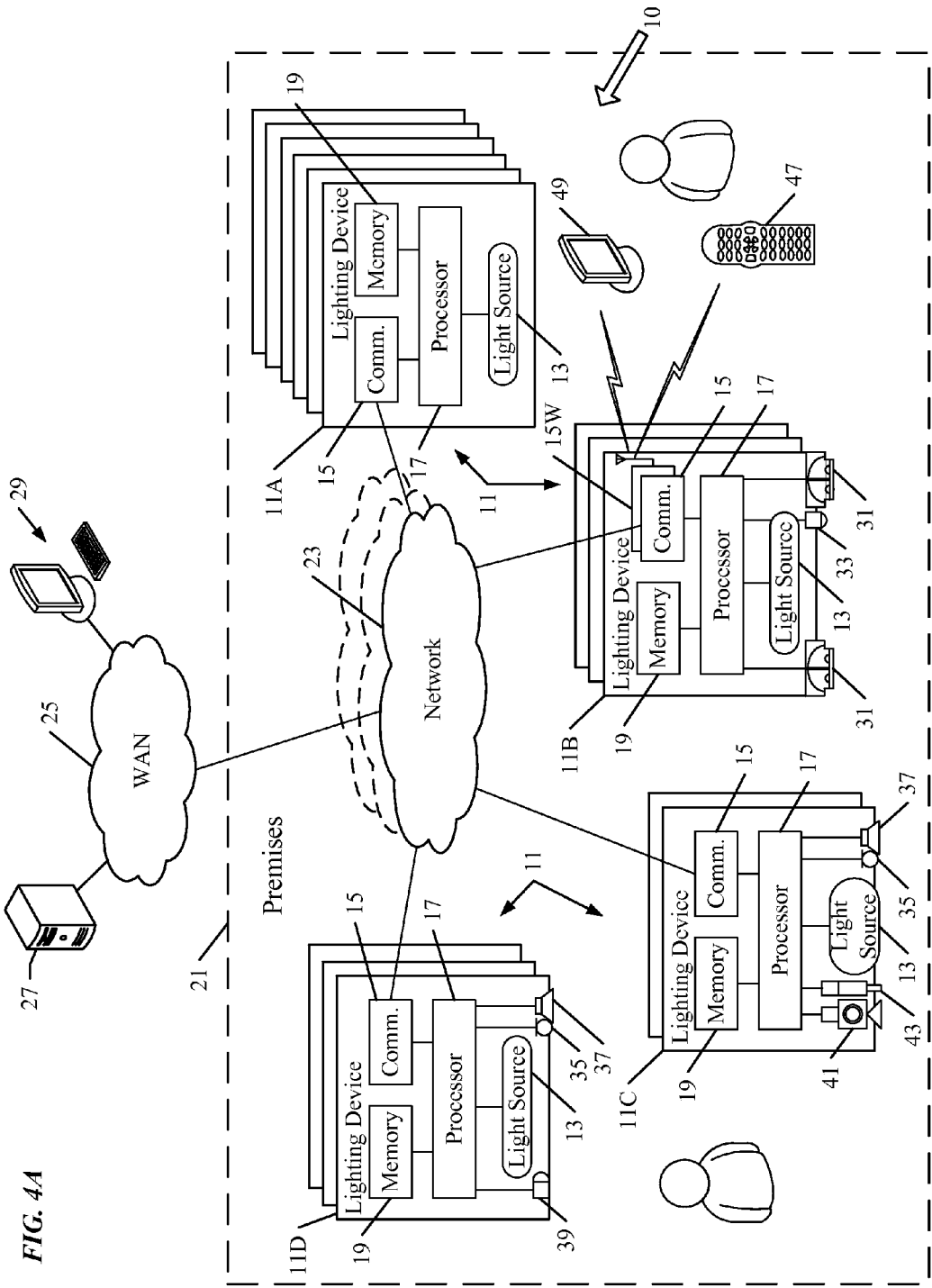
FIG. 4A is a functional block diagram of a simple example of a system having intelligent lighting devices, at least some of which include components and are configured to implement an interactive user interface so as to offer anthropomorphic control.

FIG. 4A illustrates an example of a system 10, that may utilize the learning system 100 to provide anthropomorphic control for a number of lighting devices 11 at a premises 21, in block diagram form. The illustrated example of the system 10 includes a number of adjustable lighting devices 11, such as fixtures or lamps or other types of luminaires. Anthropomorphic control of such lighting devices 11 is, for example, based on an anthropomorphic object 101 related to a persona and manipulating such lighting devices 11 and/or other controllable feature(s) of system 10 to provide a presentation for an occupant as a perceptible instance of the persona as part of the lighting and other services offered in areas of the premises 21. As described above and further below, such anthropomorphic object 101 may be developed or learned via learning system 100. Several different configurations of the lighting devices 11 are shown by way of examples. The represented differences amongst the examples of devices 11 will be discussed more fully later.

The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device 11 may provide light for use by automated equipment, such as sensors/monitors, robots, etc. that may occupy or observe the illuminated space, instead of or in addition to light provided for an organism. A lighting device 11, for example, may take the form of a lamp, light fixture or other luminaire that incorporates a source, where the source by itself contains no intelligence or communication capability (e.g. LEDs or the like, or lamp ("regular light bulbs") of any suitable type). Alternatively, a fixture or luminaire may be relatively dumb but include a source device (e.g. a "light bulb") that incorporates the intelligence and communication capabilities discussed herein. In most examples, the lighting device(s) 11 illuminate a service area to a level useful for a human in or passing through the space, e.g. regular illumination of a room or corridor in a building or of an outdoor space such as a street, sidewalk, parking lot or performance venue. However, it is also possible that one or more lighting devices 11 in or on a particular premises 21 served by a system 10 have other lighting purposes, such as signage for an entrance or to indicate an exit. Of course, the lighting devices 11 may be configured for still other purposes, e.g. to benefit human or non-human organisms or to repel or even impair certain organisms or individuals.

In the premises-wide system example, each respective adjustable lighting device 11 includes a light source 13, a communication interface 15 and a processor 17 coupled to control the light source 13. The light sources may be virtually any type of light source suitable to providing illumination that may be electronically controlled. The light may be of the same general type in all of the lighting devices, e.g. all formed by some number of light emitting diodes (LEDs); although in many installations, some number of the lighting devices 11 may have different types of light sources 13.

The processor 17 also is coupled to communicate via the interface 15 and the network link with one or more others of the lighting devices 11 and is configured to control operations of at least the respective lighting device 11. The processor may be implemented via hardwired logic circuitry, but in the examples, the processor 17 is a programmable processor such as a central processing unit (CPU) of a microcontroller or a microprocessor. Hence, in the example of FIG. 4A, each lighting device 11 also includes a memory 19, storing programming for execution by the processor 17 and data that is available to be processed or has been processed by the processor 17. The machine learning algorithm 5 and data set 3 of FIG. 3, as well as anthropomorphic object 101, are examples of such programming and data stored in memory 19 for execution and processing by processor 17. The processors and memories in the lighting devices may be substantially the same throughout the devices 11 throughout the premises, or different devices 11 may have different processors 17 and/or different amounts of memory 19 (storing different programming and/or data), depending on differences in intended or expected processing needs.

The anthropomorphic control and associated learning could be implemented in off-premises processing equipment, on a central basis within the premises, or by a designated 'leader' in each service area (e.g., each room or the like) of the premises.

In the example, each lighting device has the processor, memory, programming and data set to implement the learning and related anthropomorphic control functions under consideration here, although devices serving a particular area may coordinate their operations to present a unified persona. These elements, programming, data and functions, however, may be arranged in a system in other ways. For example, in each area of a premises, one lighting device may be configured as a 'leader', to perform learning and high level control, and provide instructions to some number of other 'follower' lighting devices serving the particular area. Another approach might distribute some of the processing on a shared bases across some number of the lighting devices.

Returning to the specific examples, the intelligence (e.g. processor 17 and memory 19) and the communications interface(s) 15 are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities. For example, the communication component(s) and possibly the processor and memory (the 'brain') may be elements of a separate device or component coupled and/or collocated with the light source 13.

In our example, the system 10 is installed at a premises 21. The system 10 also includes a data communication network 23 that interconnects the links to/from the communication interfaces 15 of the lighting devices 11, so as to provide data communications amongst the intelligent lighting devices 11. Such a data communication network 23 also is configured to provide data communications for at least some of the lighting devices 11 via a data network 25 outside the premises, shown by way of example as a wide area network (WAN), so as to allow devices 11 or other elements/ equipment at the premises 21 to communicate with outside devices such as the server/host computer 27 and the user terminal device 29. The wide area network 25 outside the premises, may be an intranet or the Internet, for example.

The premises 21 may be any location or locations serviced for lighting and other purposes by a networked intelligent lighting system of the type described herein. The lighting devices 11 are located to provide lighting service in various areas in or about the premises 21. Most of the examples discussed below focus on building installations, for convenience, although the system may be readily adapted to outdoor lighting. Hence, the example of system 10 provides lighting and possibly other services, as well as anthropomorphic control of that lighting and/or other services, in a number of service areas in or associated with a building, such as various rooms, hallways, corridors or storage areas of a building and an outdoor area associated with a building. Any building forming or at the premises 21, for example, may be an individual or multi-resident dwelling or may provide space for one or more enterprises and/or any combination of residential and enterprise facilities.

The lighting devices 11, as well as any other equipment of the system or that uses the network 23 in the service areas of the premises 21, connect together with and through the network links and any other media forming the communication network 23. For lighting operations and anthropomorphic control, the lighting devices 11 (and other system elements if any) for a given service area are coupled together for network communication with each other through data communication media to form a portion of a physical data communication network. Similar elements in other service areas of the premises are coupled together for network communication with each other through data communication media to form one or more other portions of the physical data communication network at the premises 21. Local communication over the network, for example, enables some number of lighting devices serving a room or other area to coordinate user identifications, input processing, learning, anthropomorphic control and light source control, e.g. to provide coordinated illumination of the particular space.

The communication interface 15 in each lighting device 11 in a particular service area will be of a physical type and configured to operate in a manner that is compatible with the physical media and electrical protocol(s) implemented for the particular service area and/or throughout the premises 23. Although the communication interfaces 15 are shown communicating to/from the network cloud via lines, such as wired links or optical fibers; some or all of the interfaces 15 may use wireless communications media such as optical or radio frequency wireless communication. Also, although the examples in FIG. 4A show most of the lighting devices 11 having one communication interface, some or all of the lighting devices 11 may have two or more communications interfaces to enable data communications over different media with the network(s) and/or with other devices in the vicinity.

The various portions of the network in the service areas in turn are coupled together to form a data communication network at the premises, for example to form a premises-wide local area network (LAN) or the like. The overall premises network, generally represented by the cloud 23 in the drawing, encompasses the data links to/from individual devices 11 and any networking interconnections within respective areas of the premises where the devices 11 are installed as well as the LAN or other premises-wide interconnection and associated switching or routing. In many installations, there may be one overall data communication network 23 at the premises 21. However, for larger premises and/or premises that may actually encompass somewhat separate physical locations, the premises-wide network may actually be built of somewhat separate but interconnected physical networks represented by the dotted line clouds. The LAN or other data network forming the backbone of system network 23 at the premises 21 may be a data network installed for other data communications purposes of the occupants; or the LAN or other implementation of the network 23, may be a data network of a different type installed substantially for lighting system use and for use by only those other devices at the premises that are granted access by the lighting system elements (e.g. by the lighting devices 11). Communications amongst devices serving different areas of the premises, for example, may enable communication of some relevant input data, enable device(s) in one area to obtain a user profile from a device in another area, and/or support a distributed implementation of some or all of the relevant processing.

Hence, there typically will be data communication links within a room or other service area as well as data communication links from the lighting devices 11 in the various rooms or other service areas out to wider network(s) forming the data communication network 23 or the like at the premises 21. Devices 11 within a service area can communicate with each other, with devices 11 in different rooms or other areas, and in at least some cases, with equipment such as 27 and 29 outside the premises 21. For example, server 27 implements an on-line service and device(s) 11 and/or system 10 communicate with server 27 to determine a status of an identified occupant for the on-line service.

Various network links within a service area, amongst devices in different areas and/or to wider portions of the network 23 may utilize any convenient data communication media, such as power lines wiring, separate wiring such as coax or Ethernet cable, optical fiber, free-space optical, or radio frequency wireless (e.g. Bluetooth or WiFi); and a particular premises 21 may have an overall data network 23 that utilizes combinations of available networking technologies. Some or all of the network communication media may be used by or made available for communications of other gear, equipment or systems within the premises 21. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system 10 at the premises 21 or may already be present from an earlier data communication installation. Depending on the size of the network 23 and the number of devices and other equipment expected to use the network 23 over the service life of the network 23, the network 23 may also include one or more packet switches, routers, gateways, etc.

In addition to a communication interface 15 for enabling a lighting device to communicate via the network 23, some of the devices 11 may include an additional communication interface, shown as a wireless interface 15W in the lighting device 11B. The additional interface allows other elements or equipment to access the communication capabilities of the system 10, for example, as an alternative user interface access or for access through the system 10 to the WAN 25.

A host computer or server like 27 can be any suitable network-connected computer, tablet, mobile device or the like programmed to implement desired network-side functionalities. Such a device may have any appropriate data communication interface to link to the WAN 25. Alternatively or in addition, a host computer or server similar to 25 may be operated at the premises 21 and utilize the same networking media that implements data network 23.

The user terminal equipment such as that shown at 29 may be implemented with any suitable processing device that can communicate and offer a suitable user interface. The terminal 29, for example, is shown as a desktop computer with a wired link into the WAN 25. However, other terminal types, such as laptop computers, notebook computers, netbook computers, and smartphones may serve as the user terminal computers. Also, although shown as communicating via a wired link from the WAN 25, such a user terminal device may also or alternatively use wireless or optical media; and such a device may be operated at the premises 21 and utilize the same networking media that implements data network 23.

For various reasons, the communications capabilities provided at the premises 21 may also support communications of the lighting system elements with user terminal devices, control panels, standalone sensors and/or computers (not shown) within the premises 21. The user terminal devices and/or computers within the premises may use communications interfaces and communications protocols of any type(s) compatible with the on-premises networking technology of the system 10. Such communication with a user terminal, for example, may allow a person in one part of the premises 21 to communicate with a lighting device 11 in another area of the premises 21, to obtain data therefrom and/or to control lighting or other system operations in the other area.

The external elements, represented generally by the server/host computer 27 and the user terminal device 29, which may communicate with the intelligent elements of the system 10 at the premises 21, may be used by various entities and/or for various purposes in relation to operation of the lighting system 10 and/or to provide information or other services to users within the premises 21, e.g. via the interactive user interface portal offered by the lighting devices 11.

Returning now to the lighting devices 11, in the example of the system 10, at least one of the lighting devices 11 includes a user input sensor configured to detect user activity related to user inputs without requiring physical contact of the user; and at least one of the lighting devices 11 includes an output component configured to provide information output to the user. The drawings show several different examples of these input/output elements.

By contrast, some of the lighting devices 11 may not have user interface related elements. In the example of system 10 in FIG. 4A, each of the lighting devices 11A includes a light source 13, a communication interface 15 linked to the network 23 and a processor 17 coupled to control the light source 13 and to communicate via the interface 15 and the link to network 23. Such devices 11A may include lighting related sensors (not shown), such as occupancy sensors or ambient light color or level sensors; but the intelligent lighting devices 11A do not include any user interface components, for user input or for output to a user (other than control of the respective light source 13). The processors of devices 11A are configured (e.g. programmed in our example) for anthropomorphic control of lighting operations, for example, to control the light sources 13 of such devices 11A in response to commands received via the network 23 and the interfaces 15 such that a presentation for an occupant is provided as a perceptible instance of a persona. The processors of devices 11A are also configured, for example, with the machine learning algorithm 5 of FIG. 3 such that the processors of devices 11A learn from the controlled lighting operations and the persona is developed over time based on such learning.

Figure 4B:
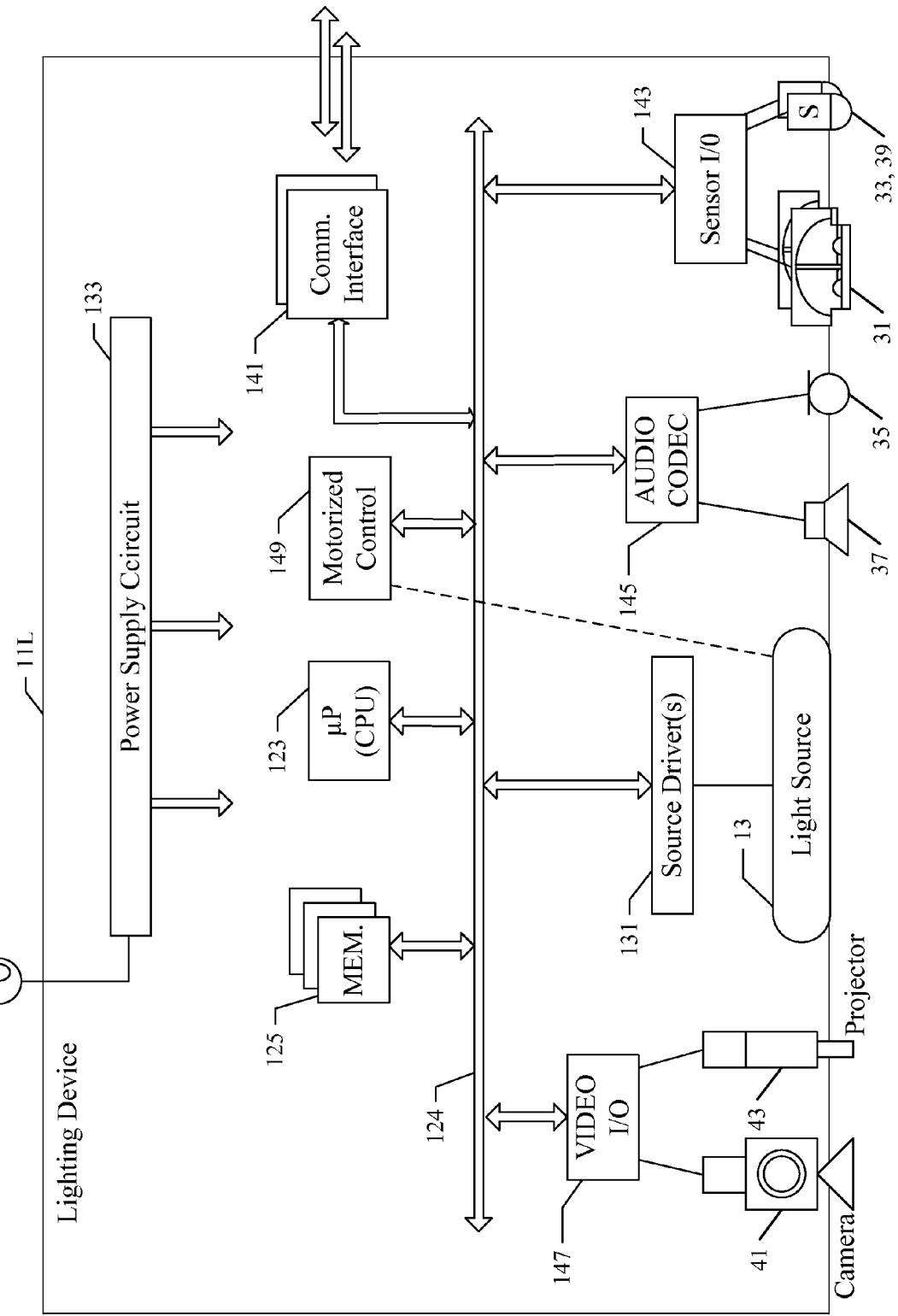
FIG. 4B is a functional block diagram of an example of an intelligent lighting device that may be used in the system of FIG. 4A.

For purposes of discussion, the drawing (FIG. 4A) shows three examples of lighting devices 11B, 11C and 11D that have one or more user interface components. Although three examples are shown, it is envisaged that still other types of interface components and/or arrangements thereof in various lighting devices may be used in any particular implementation of a system like the system 10 of FIG. 4A; and the later more detailed example of FIG. 4B shows a device that incorporates a combination of several different user input and output components. Furthermore, although the examples depict user interface components integrated within lighting device 11, such interface components may alternatively and/or additionally be implemented as standalone elements of or within other devices of system 10 and communications via the network(s), as discussed further below. Any one lighting device that includes components to support the anthropomorphic control functionality of the system 10 may include an input sensor type user interface component, an output type user interface component, or a combination of one or more input sensor type user interface components with one or more output type user interface components.

Although the various sensors are referred to generally as user input sensors and may include any combination of user interface components, such user input and/or user interface need not necessarily require direct user activity or direct interactivity with the light device 11. As described in greater detail below, the user activity referred to herein may be user interaction directly with the lighting device 11 intended to control a lighting function (e.g., the user deliberately intends to turn the light off or otherwise change a light or other control setting and gestures to the device to effect such change), the user activity may be interaction directly with other aspects of the space and indirectly with the lighting device 11 for control purposes (e.g., the user interacts with a terminal device within the space and the lighting device 11, based on task recognition and learned user preferences, adjusts operations accordingly), and/or the user activity may somewhat unintentionally interact with, and thus indirectly control, the lighting device 11 and/or system 10 (e.g., the user intentionally drinks a cup of tea when the user typically drinks a cup of coffee, unintentionally indicating a different mood of the user to the lighting device 11, which adjusts operations accordingly). An agitated conversation may be deliberate in a general sense, but not intended as a specific command to the system 10 to change a control setting or result in anthropomorphic control of the lighting or other feature(s); yet the system 10 may detect the agitated conversation as an indication of mood and respond by adjusting lighting and/or other environmental conditions in the occupied space.

With reference to FIG. 4A, each of some number of intelligent lighting device 11B at the premises 21 includes one or more sensors 31 (two in the illustrated example). The lighting devices 11B can be in one or more rooms or other service areas at the premises 21. In the intelligent lighting devices 11B, each of the sensors 31 is configured for detection of intensity of received light and to support associated signal processing to determine direction of incident light. A particular example of a sensor 31 that can be used as an input device for determining direction and intensity of incident light received by the sensor 31 is a quadrant hemispherical light detector or "QHD" (see e.g.

U.S. Pat. Nos. 5,877,490 and 5,914,487). The sensors 31 may detect light in some or all of the visible portion of the spectrum or in other wavelength bands, such as infrared (IR) or ultraviolet (UV). By using two or more such sensors 31 in the same or a different lighting device 11B illuminating the same service area, it is possible to detect position of an illuminated point or object in three-dimensional space relative to known positions of the sensors 31. By detecting position of one or more points over time, it becomes possible to track motion within the area illuminated by the device(s) 11B and monitor for user input by the sensors 31, for example, as a gestural user input or when a user transitions from location for one typical type of task to location for another type of task (e.g., transitioning from reviewing documents on a desk to interacting with a computer on the desk). Detection of rapid motion (e.g., pacing or hand gestures) may provide another technique to detect agitation of the occupant. Although two sensors 31 are shown on one lighting device 11B; there may be more sensors 31 in a lighting device 11B, or there may be a single sensor 31 in each device 11B amongst some number of the lighting devices 11B illuminating a particular service area of the premises 21.

In the example, at least one of the devices 11B also includes a lighting related sensor 33. Although shown in a device 11B for purposes of discussion and illustration, such a sensor may be provided in any of the other lighting devices 11, in addition or as an alternative to deployment of the sensor 33 in a lighting device 11B. Examples of such lighting related sensor 33 include occupancy sensors, device output (level or color characteristic) sensors and ambient light (level or color characteristic) sensors. The sensor 33 may provide a condition input for general lighting control, e.g. to turn on-off devices 11 and/or adjust light source outputs. However, the sensor input information from sensor 33 also or alternatively may be used as another form of user input, for example, to refine detection and tracking operations responsive to signals from the sensors 31.

In an example of a user input related function, the signals from the sensors 31 in lighting devices 11B illuminating a particular room within premises 21 are processed to detect gestures of one or more persons/users within the room. The lighting output from sources 13 of the devices 11 illuminating the area may be controlled, based on anthropomorphic object 101, responsive to the detection of one or more predetermined user input gestures based on user profile(s) and/or a learned control function. Alternatively, or in addition to gestural input, the signals from the sensors 31 are processed to detect a task or other activity of one or more persons/users within the room. The lighting output from sources 13 of the devices 11 illuminating the area may be controlled, based on anthropomorphic object 101, responsive to the detection of one or more predetermined or learned user input activities or task(s) based on the user's profile and/or learned control function. Although not shown, one or more of the lighting devices 11B may also include a user output component, for example to provide an audio or video output of information to the person or persons in the room based on anthropomorphic object 101.

Such gesture or user activity input together with lighting control and other information output implement a form of interactive user interface. In addition, such interactive user interface is enhanced via a persona defined by anthropomorphic object 101. This interface related operation includes selectively controlling a lighting operation of at least some number of the lighting devices, based on anthropomorphic object 101, as a function of a processed user input to provide a presentation for the occupant as a perceptible instance of the persona. The interface related operation may also include either control of a non-lighting-related function as a function of a processed user input, or an operation to obtain and provide information as a response to a user input as an output via the output component.

In the example of system 10, each of the intelligent lighting devices 11C and/or one or more of the lighting devices 11D in one or more rooms or other service areas of the premises 21 support audio input and audio output, for an audio based user interface functionality and relevant presentation of aspects of the persona based on anthropomorphic object 101. These input components may be provided in different lighting devices 11 than those deploying the output elements. Also, audio user interface components may be provided in different lighting devices 11 than those deploying the video user interface components. For convenience, the audio input and output components and the video input and output components are shown together in each of the intelligent lighting devices 11C, one or more of which may be deployed with other lighting devices in some number of the services areas within premises 21.

Hence, in the example of FIG. 4A, each intelligent lighting device 11C and/or one or more of the lighting devices 11D includes an audio user input sensor such as a microphone 35. Any type of microphone configured to detect audio user input activity, for example, for speech recognition of verbal commands or the like, may be used; and some other types of sensors may be used if they provide adequate response to audio input. Although the audio output may be provided in different devices 11; in the example, each of the intelligent lighting devices 11C or 11D also includes an audio output component such as one or more speakers 37 configured to provide information output to the user. Where the speaker is provided in the same or a different device 11, there may be a single speaker 37 in each such device 11 or there may be some number of speakers in each respective lighting device 11.

The audio input together with lighting control and audio information output implement a form of interactive user interface. In addition, such interactive user interface is enhanced via a persona defined by anthropomorphic object 101. Again, the user interface related operation includes selectively controlling a lighting operation of at least some number of the lighting devices 11 and possibly other controllable system features, based at least in part on anthropomorphic object 101, as a function of a processed user input. The control functions control outputs in a fairly typical manner, e.g. to provide desired lighting; but the anthropomorphic control also adjusts or manipulates one or more system outputs so as to provide a presentation for the occupant as a perceptible instance of the persona. The interface related operation may also include either control of a non-lighting-related function as a function of a processed user input, or an operation to obtain and provide information as a response to a user input as an output via the output component.

Although shown for illustration purposes in the intelligent lighting device 11C, image-based input and/or output components may be provided together or individually in any others of the lighting devices 11 that may be appropriate for a particular installation. Although referred to at times as "video," the image-based input and/or output may utilize still image input or output or may use any appropriate form of motion video input or output. Hence, in the example of system 10, each of several of the intelligent lighting devices 11D in one or more rooms of the premises 21 also supports image input and output for a visual user interface functionality and presentation of relevant portions of the persona, based on anthropomorphic object 101. Although related audio input and audio output could be implemented in other lighting devices, in the example, the devices 11C also have the microphone 35 and the speaker 37 for the audio based user interface functionality and persona presentation outlined above.

For the visual user interface functionality, an intelligent lighting device 11C includes at least one camera 41. The camera 41 could be a still image pickup device controlled to capture some number of images per second, or the camera 41 could be a video camera. By using a number of cameras 41 to capture images of a given service area, it is possible to process the image data to detect and track user movement in the area, for example, to identify user input gestures or when a user transitions from one task to another task (e.g., transitioning from reviewing documents on a desk to interacting with a computer on the desk) in addition to or as an alternative to processing of inputs via sensors 31. The multiple cameras 41 could be in a single lighting device 11C or could be provided individually in two or more of the lighting devices that illuminate a particular room or other service area. The image capture may also support identification of particular individuals, e.g. via processing of images for face recognition, and associated customization of gesture recognition and/or user responsive system operations.

The visual output component in the lighting device 11C is a projector 43, such as a pico projector, in this example. The visual output component may take other forms, such as an integral display as part of or in addition to the light source. Returning to the example of FIG. 4A, the projector 43 can present information in a visual format, for example, as a projection on a table or a desk top or a wall or the floor. Although shown in the same device 11C as the camera 41, the projector 43 may be in a different intelligent lighting device 11. Also, the projector may be provided in a device 11 in an area that does not utilize a camera 41 for the user input sensor. For example, the projector 43 may be in a device or in a service area with another device 11 that utilizes a microphone (35) or the like as an audio sensor for spoken user input in an area that may also use sensors such as 31 in one or more devices 11B to detect gestural inputs or other user activity or task(s).

The combination of image-based input together with lighting control and image-based and/or audio information output implement a form of interactive user interface. In addition, such interactive user interface is enhanced via a persona defined by anthropomorphic object 101. Again, the system controls lighting etc. in the particular space; and the user interface related operation includes selectively controlling a lighting operation of at least some number of the lighting devices 11, based on anthropomorphic object 101, as a function of a processed user input based on the user's profile and/or learned control function to provide a presentation for the occupant as a perceptible instance of the persona. The interface related operation may also include either control of a non-lighting-related function as a function of a processed user input, or an operation to obtain and provide information as a response to a user input as an output via the output component. With a combination of visible display and audio output capabilities, for example, the system may present the persona at least in part as an avatar personal assistant for an identified occupant along with control of lighting and/or other environmental conditions.

In the example, one or more of the processors 17 in the lighting devices 11 are configured to process user inputs detected by the user input sensor(s), such as the visual sensors 31, 33, 41, microphone(s) 35 and/or light sensors 33. Of course, other non-contact sensing technologies may be used (e.g. ultrasound) instead of or in combination with the input sensors discussed above. The processing of sensed user inputs, including for learning and anthropomorphic control, may relate to and control operations of the lighting devices 11 in one or more areas of the premises 21. For example, the processing may detect spoken commands and/or relevant gestural inputs or other direct and indirect inputs from a user and, based on the learning algorithm and/or anthropomorphic object 101, control lighting devices 11 in an area in which the user currently is located. For example, the resulting output control signals may serve to turn lights ON/OFF, to raise or lower lighting intensity, to change a color characteristic of any tunable lighting devices 11 and/or various combinations of such changes to provide a presentation for the occupant as a perceptible instance of the persona. As other examples, state changes responsive to the resulting outputs may include changes of any one or any combination of: light distribution shape, spectral content (without changing color), aperture and/or fixture shape/size, fixture aim, color and/or luminance uniformity across fixture output, etc. Changes in light output(s) in response to detected user inputs may also produce a repeating pattern or other sequence of changes in any one or more of the examples or still other lighting related parameters, e.g., so as to convey information or direct attention or to provide a desired variable lighting effect (such as a variable color 'light show' or mood lighting). Changes in the lighting in the occupied area of premises 21 in response to such sensed user inputs would provide the user with a visual cue as part of the interactive user interface functionality and persona presentation. The user inputs also may be processed to control, based on anthropomorphic object 101, lighting devices 11 serving other areas of the premises 21.

In addition to lighting control functions, such as mentioned here by way of example, one or more processors 17 in the intelligent lighting devices 11 may be configured to process direct and/or indirect user inputs so as to enable the system 10 to obtain and present requested information to a user at the premises 21 and/or obtain requested or otherwise relevant information about the user for use and/or processing by system 10, some element within system 10, and/or some other element or device at the premises 21. By way of an example of such additional operations, the system 10 may also enable use of the lighting devices 11 to form an interactive user interface portal, for access to other resources at the premises 21 (e.g., on users computers in other rooms at the premises) and/or access to outside network resources such as on server 27 or a remote terminal 29 (e.g. via the WAN 25). Alternatively, or in addition, such obtained information may also be processed as user inputs by one or more processors 17 in the intelligent lighting devices 11 to control a lighting function. For example, as described in greater detail below, one or more processors 17 may access an on-line service to which a user is subscribed, such as might be hosted on server 27 (e.g., Facebook™, Twitter™, etc.), and determine an on-line status corresponding to the subscribed user. In this example, such on-line status may be processed as an additional user input to enhance the interactive user interface functionality and persona presentation (e.g., an identified occupant posts a positive status on-line prior to arriving at work and, upon entering the room, lighting device 11 greets the occupant with a hearty "good morning" via speaker 37).

In the example, one or more of the memories 19 store the user inputs detected by the user input sensor(s) as data set 3 of the learning system 100 and one or more of the processors 17 in the intelligent lighting devices 11 are configured to implement the machine learning algorithm 5 of the learning system 100. In this way, the intelligent lighting devices 11 learn, for example, from the various user inputs detected by the user input sensor(s) and the one or more processors 17 may incorporate such learning into the operations of the system 10 to implement a lighting control function, based on anthropomorphic object 101.

Although shown for illustration purposes in the intelligent lighting device 11D, any one or more of the lighting devices 11 may include a sensor 39 for detecting operation of the lighting source 13 within the respective device 11. Such a sensor 39 may sense a temperature of the source 13 or of other component(s) of the device 11D, or a sensor 39 may sense an optical output of the source 13 (e.g. level or color characteristic). The sensor 39 essentially provides feedback as to the state of the source 13 or other component(s) of the device 11D, which may be used as part of the general control of the lighting device(s) 11. By way of an example, where the performance of the source may have an effect on sensing of user inputs, e.g. when a device 11B or 11C in a particular service area optically detects gestures or other visual user inputs, source related feedback from sensor 39 may be used to adjust output of the source 13 in one or more of the devices illuminating the area in a manner intended to assist in the detection of the visual user input (e.g. to ensure adequate illumination for gesture detection).

In a system such as system 10 of FIG. 4A, the lighting devices 11 incorporate the elements and provide processing to support an interactive user interface, for example, that need not require the user to touch or otherwise physically contact an element of the system. The user also need not have or operate a separate device, such as a smartphone or other portable terminal device. The lighting devices themselves implement the interactive user interface to the lighting system, and the user interacts with the lighting system, either intentionally or unintentionally, via the lighting devices 11. In addition to otherwise normal control functions, e.g. to turn on lights, the control functions manipulate system outputs to present an anthropomorphic persona. Furthermore, such interactive user interface is not based solely on intentional user interaction directly with the lighting system. As described above and in greater detail below, the various sensors 31, 33, 35, and 41 may capture, as user inputs, other user activity, either intentional or unintentional and involving either direct interaction with the lighting system for control of the lighting system or indirect interaction through other objects and/or occupants within the space illuminated by the lighting system. In addition, the lighting system may acquire user inputs from external sources, such as the user's status for an on-line service (e.g., Facebook™, Twitter™, etc.), and, based on these user inputs from external sources, modify the operation of the lighting system. The lighting system, for example, also learns from these current user inputs as well as a collection of prior user inputs to modify the operation of the lighting system via implementation of learning system 100 of FIG. 3, as described in greater detail below. The learning system may modify regular operations, e.g. light level control, as well as the persona.

The user interface through the lighting device is given by way of example. The system 10, however, may also include or support communications for other elements or devices at the premises 21, some of which may even offer alternative user interface capabilities instead of or in addition to the interactive user interface supported by the lighting devices 11. For example, the intelligence (e.g. processor 17 and memory 19) and the communications interface(s) 15 may be implemented in other elements or devices (i.e. control panel) of system 10. Additionally, standalone sensors of the lighting system that are interconnected to the data communication network of the system may perform sensing functions analogous to those of sensors 31, 33, 35, 37, 39, 41 and/or 43 in the system 10. See, for example, U.S. application Ser. No. 13/903,330, Filed May 28, 2013 entitled "LIGHTING NETWORK WITH AUTONOMOUS COMMISSIONING", and U.S. application Ser. No. 13/964,564, Filed Aug. 12, 2013 entitled "LIGHTING ELEMENT-CENTRIC NETWORK OF NETWORKS", both of which are entirely incorporated by reference.

The system 10 of FIG. 4A may also support wireless communication to other types of equipment or devices at the premises 21, to allow such other equipment or devices to use the network 23 and/or to communicate with the lighting devices 11. By way of example, present drawing FIG. 4A therefore shows one of the lighting devices including a wireless communication interface 15W, for such a purpose. Although shown in 11B, such an interface 15W may instead or in addition be provided in any of the other lighting devices 11 in the system 10. Of note for purposes of the present discussion of user interface techniques, the wireless link offered by the wireless communication interface 15W allows the system 10 to communicate with other user interface elements at the premises 21 that are not included within lighting devices 11 but which may be used in addition or as a supplement to the lighting device-centric user interface that is otherwise the focus of the present discussion. Although there may be any of a wide range of such other types of user interface elements at any given premises 21, the drawing shows two examples, a remote control 47 as an additional input device and a television or monitor 49 as an additional output device. The wireless link(s) to devices like 47 and 49 may be optical, sonic (e.g. speech), ultrasonic or radio frequency, by way of a few examples.

Any of the various system elements may be implemented using a PC like approach based on any known or available microprocessor architecture, such as a Reduced instruction set computing (RISC) using an ARM architecture, as commonly used today in mobile devices and other portable electronic devices, or a microprocessor architecture more commonly used in computers such as an instruction set architecture (ISA), like those used in Intel microprocessors and the like. The microprocessor based approaches are discussed by way of examples, with respect to FIG. 4B; however, other processor implementations may be used, such as based on a Peripheral Interface Controller (PIC) or other microcontroller architecture. Alternative intelligent architectures for the intelligence of the devices, however, will still include appropriate communication interfaces and couplings for light sources and may include other standardized ports for connections of sensors, user input/output devices, etc.

Turning now to the example of FIG. 4B, the drawing depicts an implementation of an intelligent lighting device 11L using a microprocessor centric architecture. The device 11L is illustrated as an example of one of the devices 11 as may be used in an overall lighting system like system 10 of FIG. 4A. A similar arrangement of lighting device 11L, however, may be deployed as an independent/standalone luminaire without reliance on other devices or elements of a premises-wide system 10. Although system 10 typically encompasses a plurality of lighting devices 11, such as device 11L, particularly when deployed throughout a premises, such as premises 21, the system 10 need not always include such plurality. A lighting device 11, such as device 11L, may also be itself a system and incorporate any and/or all of the elements discussed herein for learning and/or anthropomorphic control.

At a high level, the fixture or other type of lighting device includes a light source, a power supply circuit coupled to a power source, a processor, one or more memories and a communication interface; and the device will often include one or more sensors. The user interface components may be separate from the lighting device. The example 11L incorporates elements for a non-contact user interface portal and anthropomorphic control, based on anthropomorphic object 101. To act as a portal, the lighting device will also have one or more standard interface ports for attachment of elements for providing the desired type of user interface. Each port may be for a hardwired connection to any compatible accessory or may provide a wireless link (e.g. WiFi, Zigbee or Bluetooth) for the accessory.

As an example of an implementation of the processors 17, discussed above relative to FIG. 4A, the more detailed example of the lighting device 11L includes a microprocessor (µP) 123, which serves as the programmable central processing unit (CPU) of the lighting device 11L. The µP 123, for example, may be a type of device similar to microprocessors used in servers, in personal computers or in tablet computers, or in smartphones, or in other general purpose computerized devices. Although the drawing shows a single µP 123, for convenience, the lighting device 11L may use a multi-processor architecture. The µP 123 in the example is of a type configured to communicate data at relatively high speeds via one or more standardized interface buses, represented generally by the bus/arrow 124.

The lighting device 11L includes one or more storage devices, which are accessible by the µP 123 via the bus 124. Although the lighting device 11L could include a hard disk drive or other type of disk drive type storage device, in the example, the device 11L includes one or more memories 125. Typical examples of memories 125 include read only memory (ROM), random access memory (RAM), flash memory and the like. In this example, the memory or memories 125 store executable programming for the µP 123, such as programming implementing the machine learning algorithm 5 of learning system 100, as well as data, such as data set 3 of learning system 100 and anthropomorphic object 101, for processing by or resulting from processing of the µP 123.

As in earlier examples, the intelligent lighting device 11L includes a light source 13. The source 13 may take the form of an existing fixture or other luminaire coupled to the other device components, or the source 13 may be an incorporated source, e.g. as might be used in a new design or installation. The source 13 may be any type of source that is suitable to the illumination application (e.g. task lighting, broad area lighting, object or personnel illumination, information luminance, etc.) desired for the space or area in which the particular device 11L is or will be operated which offers desired light output control capabilities (e.g. dimming, color control etc.). Although the source 13 in the device 11L may be any suitable type of light source, many such devices will utilize the most modern and efficient sources available, such as solid state light sources, e.g. LED type light sources. LEDs are dimmable. To support color control, the device may include some number of LEDs of each of two or more different color characteristics operated via independently controllable driver channels.

Power is supplied to the light source 13 by an appropriate driver 131. The source driver 131 may be a simple switch controlled by the processor of the device 11L, for example, if the source 13 is an incandescent bulb or the like that can be driven directly from the AC current. Power for the lighting device 11L is provided by a power supply circuit 133 which supplies appropriate voltage(s)/current(s) to the source driver 131 to power the light source 13 as well as to the components of the device 11L. In the example, the power supply circuit 133 receives electricity from alternating current (AC) mains 135, although the lighting device may be driven by a battery or other power source for a particular application. Although not shown, the device 11L may have or connect to a back-up battery or other back-up power source to supply power for some period of time in the event of an interruption of power from the AC mains 135.

The source driver circuit 131 receives a control signal as an input from the processor 123 of the device 11L, to at least turn the source 13 ON/OFF. Depending on the particular type of source 13 and associated driver 131, the processor input may control other characteristics of the source operation, such as dimming of the light output, pulsing of the light output to/from different intensity levels, color characteristics of the light output, etc. based on anthropomorphic object 101. If the source and/or driver circuit have the capability, the driver circuit 131 may also provide some information back as to the operation of the light source 13, e.g. to advise the processor 123 of the actual current operating state of the source 13.

The lighting device 11L also includes one or more communication interfaces 141. The communication interfaces at least include an interface configured to provide two way data communication for the µP (and thus for the device 11L) via the network 23. In the example of FIG. 4B, each communication interface 141 is of a type having a bus interface to enable the interface 141 to communicate internally with the µP 123 via the bus 124. The interface 141 that provides the communication link to the data communications network 23 enables the µP 123 to send and receive digital data communications through the particular network 23. As outlined earlier, the network 23 may be wired (e.g. metallic or optical fiber), wireless (e.g. radio frequency or free space optical), sonic or ultrasonic, or a combination of such network technologies; and the interface 141 to that network 23 in a particular installation of the device 11L will correspond to the most advantageous network available (based on considerations such as cost and bandwidth) at the location of the installation. Some devices 11L may include multiple interfaces to the network 23; and or some devices 11L may include interfaces (analogous to the interface 15W discussed earlier) for communication with other equipment in the vicinity.

A device like 11A in the FIG. 4A example may have just the components of device 11L discussed to this point in our more detailed example. However, for implementations of devices like 11B to 11C in the FIG. 4A example, the device 11L may have one or more user input sensors configured to detect user activity related to user inputs and/or one or more output components configured to provide information output to the user, based on anthropomorphic object 101. Although the input and output elements and/or such elements of different types may or may not be included, for convenience, the device 11L shown in FIG. 4B includes both input and output components as well as examples of several types of such components.

The lighting device 11L in this example further includes a motorized control 149. Such motorized control 149 allows the lighting device 11L and/or elements within the lighting device 11L (i.e., light source 13, microphone 35, camera 41, sensors 31, 33, 39, etc.) to be moved and/or adjusted. Depending on the fixture design, the motorized control may provide control in one, two or more degrees of freedom, e.g. generally vertical and tilt, and/or with lamp-head rotation about one, two or three axes. In one example, the motorized control 149, in response to user input and/or based on anthropomorphic object 101, moves the lighting source 13 back and forth in a swaying fashion, as if to "wave". The control 149 may adjust source 13 orientation, based on anthropomorphic object 101, to spotlight and follow a user as the user moves about a room, as another example. In still another example, the motorized control 149, based on the anthropomorphic object 101, moves camera 41 so as to track the movement of an occupant through the space. Alternatively, or in addition to, motorized control 149, for example, moves projector 43, based on anthropomorphic object 101. Each of these examples depict anthropomorphic control, based on anthropomorphic object 101, to provide a presentation for the occupant as a perceptible instance of the persona of lighting device 11L.

In the example, the intelligent lighting device 11L includes a number of optical sensors, including one of more of the sensors 31 configured for detection of intensity of received light and to support associated signal processing to determine direction of incident light. The intelligent lighting device 11L in this example also includes another type light sensor, such as a sensor 33 or 39. Although only one circuit 143 is shown for convenience, the device 11L will include appropriate input/output interfaces to operate and receive signals from the applicable sensors 31, 33 and 39 included in the particular implementation of the device 11L.

A sensor such as 31, 33 or 39 typically includes one or more physical condition detectors, which form the actual device that is responsive to the particular condition to be sensed. The detector(s) may receive a drive signal; and in response to the sensed condition, the detector(s) produces one or more signals having a characteristic (e.g. voltage magnitude, current or frequency) that is directly related to a characteristic level of the sensed condition. A sensor such as 31, 33 or 39 also includes a detector interface circuit that provides any drive signal that may be needed by the particular device type of physical condition detector. The detector interface circuit also processes the output signal from the detector to produce a corresponding output, in a standardized format.

The sensor I/O circuit 143 in turn provides the input and output interface to couple the particular sensor(s) 31, 33 or 39 with the other components of the intelligent lighting device 11L. On the side logically facing the bus and processor, the sensor I/O circuitry 143 in the illustrated architecture provides a bus interface that enables the µP 123 to communicate with the respective I/O interface circuit 143 via the bus 124. A port for coupling the circuit 143 to the bus 124 may be in accordance with a standard, such as USB. Although not shown, the sensor I/O circuit 143 may fit a standard interface port on the board forming the 'brain' and communication portion of the device 11L; and/or the sensor I/O circuit 143 may provide physical and electrical connections as well as a protocol for the interface with the applicable sensor such as 31, 33 or 39 in accordance with a standard, to allow use of sensors by different manufacturers.

The description of the sensors and I/O circuitry are given by way of example, and actual implementations may use somewhat different arrangements. For example, the detector interface circuit referred to above as part of the sensor may be incorporated in the applicable sensor I/O circuit 143. Each of the circuit(s) 143 may be configured to provide the electrical interface for one, two or more of the respective sensors via the associated coupling(s).

In the example, the intelligent lighting device 11L includes a microphone 35, configured to detect audio user input activity, as well as an audio output component such as one or more speakers 37 configured to provide information output to the user, including some portion of a presentation for the occupant as a perceptible instance of a persona. Although other interfaces may be used, the example utilizes a bus connect audio interface circuit that is or includes an audio coder/decoder (CODEC), as shown at 145. The CODEC 145 converts an audio responsive analog signal from the microphone 35 to a digital format and supplies the digital audio to the µP 123 for processing and/or a memory 125 for storage, via the bus 124. The CODEC 145 also receives digitized audio via the bus 124 and converts the digitized audio to an analog signal which the CODEC 145 outputs to drive the speaker 37. Although not shown, one or more amplifiers may be included to amplify the analog signal from the microphone 35 or the analog signal from the CODEC 145 that drives the speaker 37.

In the example, the intelligent lighting device 11L also includes a camera 41, configured to detect visible user input activity, as well as an image (still or video) output component such as a projector 43, configured to provide information output to the user in a visual format, including some portion of a presentation for the occupant as a perceptible instance of a persona. The lighting device will also include appropriate input signal processing circuitry and video driver circuitry, for example, as shown in the form of a video input/output (I/O) circuit 147. The interface(s) to either one or both of the camera 41 and the projector 43 could be analog or digital, depending on the particular type of camera and projector. The video I/O circuit 147 may also provide conversion(s) between image data format(s) used on the bus 124 and by the µP 123 and the data or signal formats used by the camera 41 and the projector 43.

The actual user interface elements, e.g. speaker and/or microphone or camera and/or projector, may be in the lighting device 11L or may be outside the device 11L with some other link to the fixture. If outside the lighting device 11L, the link may be a hard media (wire or fiber) or a wireless media.

The device 11L as discussed above and shown in the drawing includes user interface related components for audio and optical (including image) sensing of user input activities. That intelligent lighting device also includes interface related components for audio and visual output to the user, such as output necessary to provide a presentation for the user as a perceptible instance of a persona. These capabilities of the device 11L and the system 10 support an interactive user interface, based on anthropomorphic object 101, through the lighting device(s), for example, to control lighting operations, to control other non-lighting operations at the premises and/or to provide a portal for information access (where the information obtained and provided to the user may come from other equipment at the premises or from network communications with off-premises systems). In addition, the interactive user interface is enhanced via implementation of the learning system 100 of FIG. 3 and anthropomorphic object 101 of FIG. 1, as described in greater detail below. Such enhancements allow the interactive user interface to provide a presentation for the occupant, based on anthropomorphic object 101, as a perceptible instance of a persona related to lighting device 11L.

For example, the device 11L and/or the system 10 can provide a voice recognition/command type interface via the lighting device and network to obtain information, to access other applications/functions, etc. For example, a user can ask for the system to check his/her calendar and/or the calendar of someone else and can ask the system to schedule a meeting. In response, the system may provide an audio confirmation of the scheduled meeting in the system's "own voice" as well as generate and send a message (e.g., e-mail, text, etc.) confirming the scheduled meeting to the user signed by the system, based on anthropomorphic object 101. In addition, the system may provide a similar audio notification(s) and/or message confirmation(s) to other participant(s) of the scheduled meeting, also based on anthropomorphic object 101. As described in greater detail below, the persona presented via such notification(s) and/or confirmation(s) may be consistent or otherwise display characteristics in common across any potential participant (i.e., the same persona for everyone). Alternatively, or in addition, the persona presented may differ based on the intended recipient, the source (i.e., the user), and/or other criteria, such as location within a premises 21, time, environmental conditions, etc. That is, device 11L and/or system 10, for example, provides a common and consistent persona throughout a premises 21 or a persona that is customizable and/or customized to a particular portion of premises 21, a particular user, and/or a particular user within a particular portion of premises 21. Furthermore, based on lighting operations during prior meetings and user activity during the scheduled meeting, device 11L and/or the system 10, influenced by learning system 100 and based on anthropomorphic object 101, may adjust and/or otherwise control lighting operations and/or other controllable features during the scheduled meeting to provide a presentation for the occupants as a perceptible instance of the persona.

In an initial implementation, the speech is detected and digitized in the lighting device 11L and is processed to determine that the lighting device 11L has received a command or a speech inquiry. For an inquiry, the lighting device 11L sends a parsed representation of the speech through the lighting system 10 (and possibly an external network 25) to a server or the like with full speech recognition capability. The server identifies the words in the speech and initiates the appropriate action, for example, to turn OFF or otherwise control light source 13. The server sends the information back to the lighting device 11L (or possibly to another device) with the appropriate output capability, for presentation to the user as an audible or visual output, based on anthropomorphic object 101. Any necessary conversion of the information to speech may be done either at the server or in the lighting device, depending on the processing capacity of the lighting device. As the processing capacity of lighting devices increases, some or all of the functions of the server in this example may be shifted into the lighting devices.

The lighting device 11L and the system 10 may provide similar services in response to gestural inputs, detected via sensors 31, one or more cameras 41 or a combination of sensors and cameras. Also, systems that include both audio and optical input components can respond to combinations of speech and gestural inputs. Systems that include both audio and video output components can present information to the user(s) in various desirable combinations of audio and still image or video outputs, based on anthropomorphic object 101, in such a manner as to provide a presentation for the user as a perceptible instance of the persona of the system. A simple persona may be presented via lighting and/or motion control. A more sophisticated and possibly more human-like persona can be presented, however, by use of audio or audio-visual output capabilities.

With an approach like that outlined above, the lighting system may support a broad range of applications or functions often performed via other user terminal devices. For example, the user may be able to post to social media, access social media, send messages via mobile message (e.g. text) or instant messaging or email. The system with the interface portal enables the lighting system/service provider or some other operator of the system 10 to offer other services, such as information access and personal communication. The lighting device 11 and/or system 10 may detect when the user enters the area and provide notices to appropriate 'friends' or the like. In addition, as described in greater detail below, the lighting system may also capture this information provided via the interface portal (i.e., social media status update and/or message content), utilize the captured information to learn about the user (e.g., current mood, plans, deadlines, etc.) and modify the operation of the lighting system to reflect the user's current condition and/or situation as well as a developed persona of the lighting system.

Figure 5:
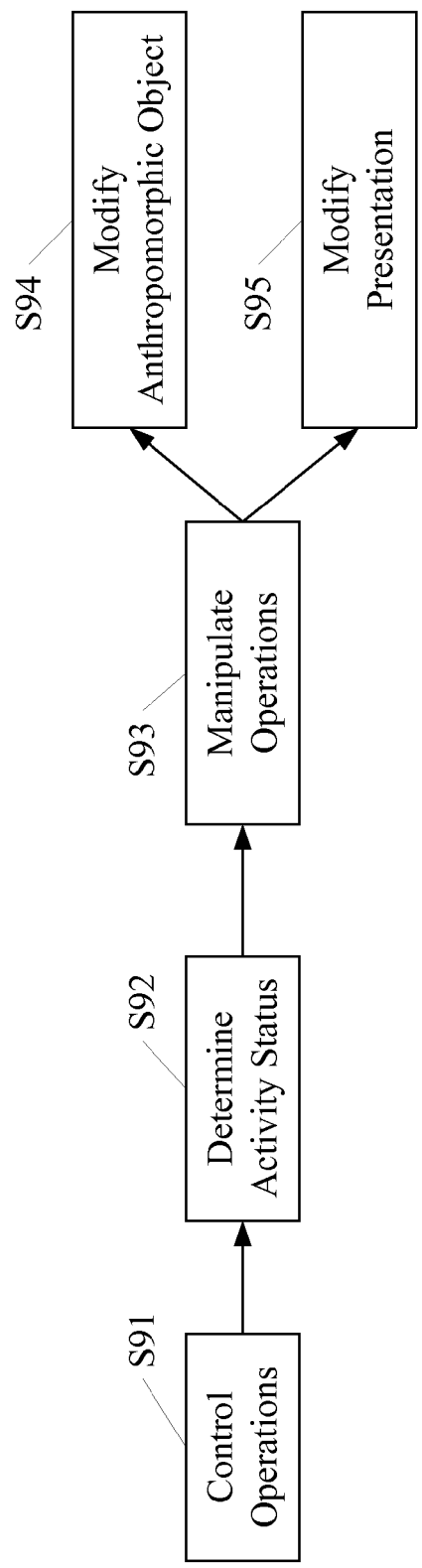
FIG. 5 is a flow chart of an example process to implement anthropomorphic control of lighting and other output conditions within the system of FIG. 4A using the learning system of FIG. 2.

As described above and in greater detail below, an enhanced interactive user interface implements anthropomorphic control of elements within a system, such as lighting system 10, to provide a presentation for an occupant as a perceptible instance of a persona of the system, based on anthropomorphic object 101. In addition, incorporation of the learning system 100 further enhances the interactive user interface by allowing the lighting devices 11 and/or lighting system 10 to learn from individual occupants within a room or other space and develop the persona based on such learning. FIG. 5 illustrates an example of a process to implement anthropomorphic control of lighting and other output conditions within a system, such as lighting system 10 and/or lighting device 11, based on anthropomorphic object 101 using the learning system 100.

In step S91, system 10 and/or lighting device 11 controls operations of one, two or more of the various elements, such as light source 13, sensor(s) 31, 33, 39, motorized control 149, camera 41, projector 43, microphone 35 and/or speaker 37. Such operations control includes, for example, illuminating a room or other space while an occupant is present. The illumination is based, for example, on a variety of visible light output parameters (e.g., intensity, color (CCT, CRI, spectral content, etc.), distribution, shape, variation, etc.).

In step S92, system 10 and/or lighting device 11 determines an activity status for an occupant of the room or other space. For example, an occupant enters or leaves the room, an occupant transitions from one task to another task, or an occupant interacts with system 10 and/or lighting device 11 to control lighting operations (e.g., via a voice command and/or gestural input). In response to the determined activity of step S92, system 10 and/or lighting device 11 manipulate the operations, in step S93, of system 10, lighting device 11 and/or other elements, based on anthropomorphic object 101, at least in part to provide a presentation for the occupant as a perceptible instance of a persona.

In one example, an occupant currently within the room or other space leaves. Upon detecting that the occupant is leaving, in step S92, the system 10 and/or lighting device 11, for example, changes the state of light source 13 to OFF and utilizes the speaker 37 to announce "good bye" to the now former occupant, in step S93. In another example, an occupant enters the room or other space and begins conducting a task (e.g., interacting with a computer terminal or reviewing papers on a desk). Upon detecting the occupant's presence, in step S92, system 10 and/or lighting device 11, in step S93, changes the state of light source 13 to ON and utilizes the speaker 37 to announce "hello" to the occupant.

Over time, the learning system 100 determines, for example, that the first of the two previous examples typically occurs in the late afternoon around 5:00 PM. The learning system 100 also determines, for example, that the second of the two previous examples typically occurs in the morning around 9:00 AM. In step S94, this "learning" is utilized to modify anthropomorphic object 101. That is, anthropomorphic object 101 is modified to incorporate several pieces of information: that an occupant typically arrives in the morning; such morning arrival is to begin work; that an occupant typically leaves in the late afternoon; and that such leaving ends the work day. Furthermore, in step S95, the presentation for the occupant is modified to reflect the developing persona. For example, when the occupant arrives and begins working, system 10 and/or lighting device 11 controls light source 13 to change color characteristics and/or CCT to simulate sunlight and utilizes the speaker 37 to announce "good morning". As a further example, when the occupant leaves, system 10 and/or lighting device 11 controls light source 13 to change color characteristics and/or CCT to simulate moon light and utilizes the speaker 37 to announce "good evening". In this way, the persona of system 10 and/or lighting device 11, as defined by anthropomorphic object 101, is developed based on user activity and learning via learning system 100.

Figure 6:
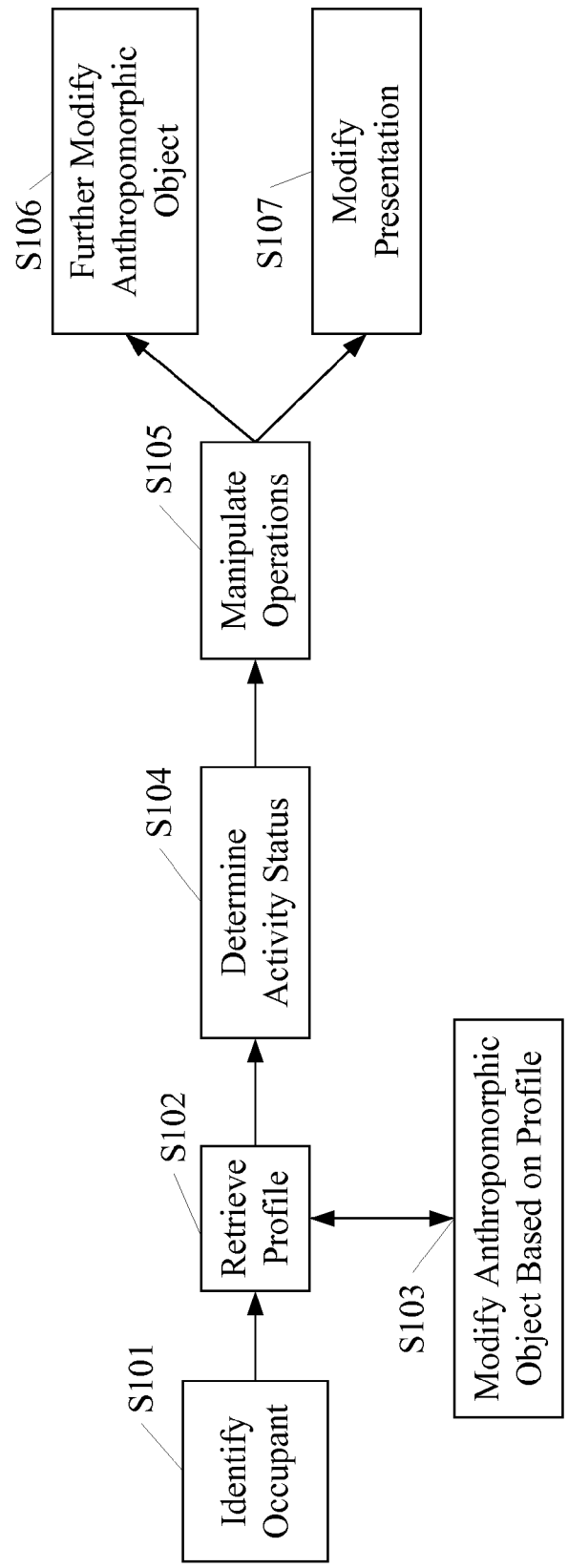
FIG. 6 is a flow chart of another example process to implement anthropomorphic control of lighting and other output conditions within the system of FIG. 4A using the learning system of FIG. 2.

FIG. 6 illustrates another example of a process to implement anthropomorphic control of lighting and other output conditions within a system, such as lighting system 10 and/or lighting device 11, based on anthropomorphic object 101 using learning system 100. In step S101, system 10 and/or lighting device 11 identifies a particular occupant within a room or other space, as discussed above. In step S102, system 10 and/or lighting device 11 retrieves a profile related to the identified occupant. The profile, for example, includes modifications to the anthropomorphic object 101 such as user preferences and biases as well as characteristics specific to the identified occupant developed previously by the persona. For example, the developed persona has determined, via learning system 100, that a particular occupant, while consistently arriving at work early, is typically not in a good mood and/or does not appreciate "cheery" greetings when first arriving at work. Such determination, or learning, is based on, for example, the occupant's dimming the light source 13 and turning off speaker 37 in response to previous "cheery" greetings from system 10 and/or lighting device 11. The system 10 and/or lighting device 11 utilize the profile related to an identified occupant, in step S103, to modify anthropomorphic object 101 such that the persona is "personalized" for the identified occupant. That is, lighting device 11 and/or system 10 provides, for example, a "cheery" greeting and "bright" lights for most occupants, including some identified occupants while providing a "muted" welcome to other identified occupants, including the occupant who is not a morning person from our example.

Similar to steps S92 and S93 of FIG. 5, the system 10 and/or lighting device 11 determine an activity status of the identified occupant in step S104 and manipulate operations, in step S105, of the system 10, lighting device 11 and/or other element to provide a presentation for the occupant as a perceptible instance of the persona. In our current example, when the occupant who is not a morning person first arrives, system 10 and/or lighting device 11 may control the light source 13 to provide only subdued lighting and, instead of utilizing the speaker 37 to announce a greeting, system 10 and/or lighting device 11 may generate a message, such as an e-mail message, addressed to the occupant that includes the occupant's schedule for the day and the system's signature.

Although examples of activity status have been focused on user activity within a room or other space, given an occupant's specific identity, as in the process of FIG. 6, such activity status need not be so limited. As described above in relation to FIGS. 4A-4B, the interactive user interface of system 10 and/or lighting device 11 allows, for example, the system to determine an on-line status for the identified occupant (e.g., status post to Facebook™). Returning to our occupant who is typically not a morning person, on one morning before arriving to work, for example, the occupant makes a particularly cheery post to an on-line service. As part of step S104 in FIG. 6, system 10 and/or lighting device 11 determine not only that the occupant has entered the room or other space, but also that the occupant has made such a post. As a result, in step S105, system 10 and/or lighting device 11 controls the light source 13 to provide less subdued lighting and utilizes the speaker 37 to announce "I see from your on-line status you're in a good mood this morning." In this way, the system's persona is not only personalized to an identified occupant's preferences, based on the modified anthropomorphic object 101, but is also current and relevant to the identified occupant and that occupant's activity.

As with the process of FIG. 5, over time, learning system 100 will "learn" how each identified occupant reacts to the developed persona, as defined by anthropomorphic object 101. This learning results in further modifications to the anthropomorphic object 101, in step S106, and the presentation of the persona, in step S107. Determining that the occupant is not a morning person is one example of such learning. As another example, the identified occupant may tend to take an hour for lunch around 11:30 AM, by which time the occupant is generally in a better mood. In this example, based on this learning and modified anthropomorphic object 101, system 10 and/or lighting device 11 may control the light source 13 to change the color characteristics or CCT to simulate noontime sunlight and utilize the speaker to announce "it's lunch time" at 11:30 AM each day. Then, when the occupant returns from lunch, the system 10 and/or lighting device 11 may control the light source 13 to change the shape and direction such that a spotlight is focused on a user terminal and utilize speaker 37 to announce "time to get back to work".

Figure 7:
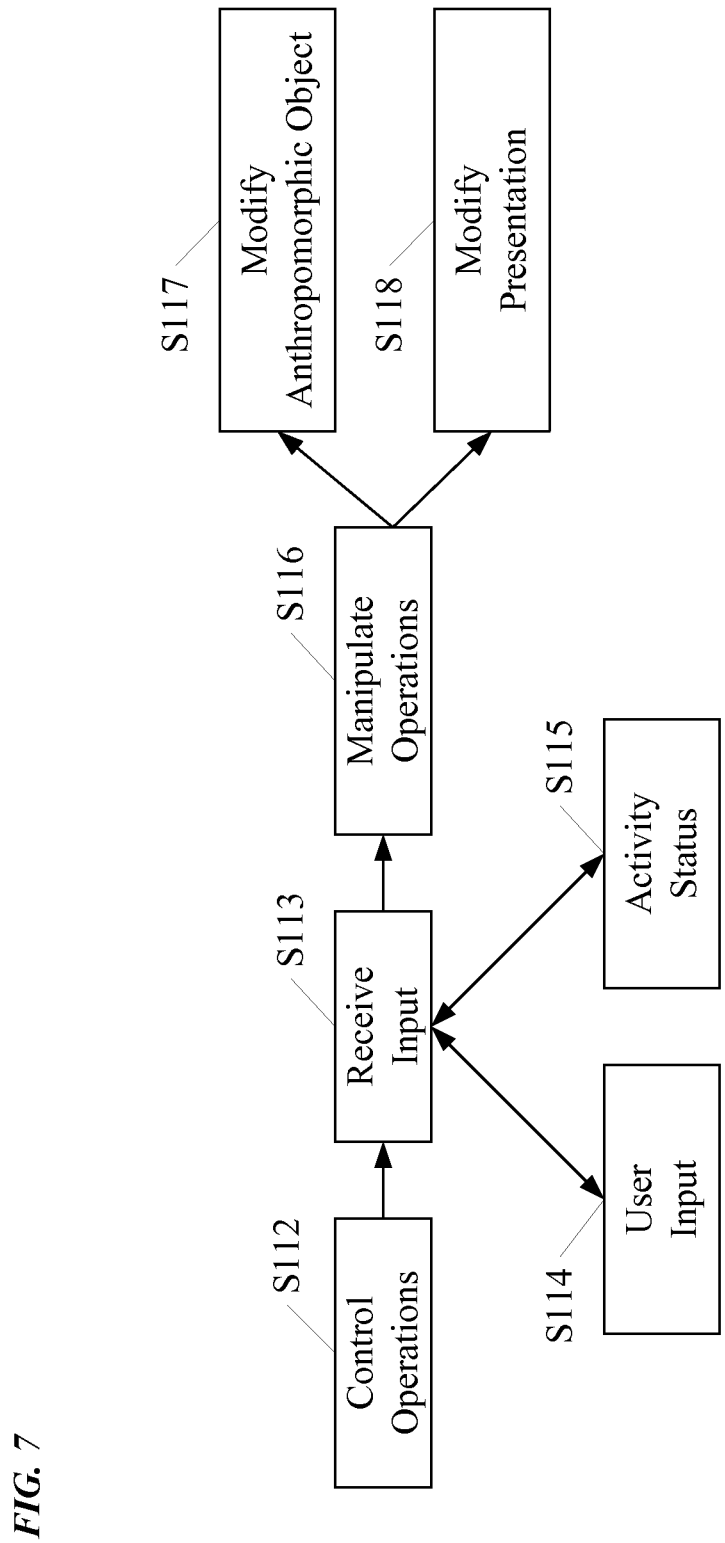
FIG. 7 is a flow chart of still another example process to implement anthropomorphic control of lighting and other output conditions within the system of FIG. 4A using the learning system of FIG. 2.

FIG. 7 illustrates still another example of a process to implement anthropomorphic control of lighting and other output conditions within a system, such as lighting system 10 and/or lighting device 11, based on anthropomorphic object 101 using learning system 100. While FIGS. 5-6 provide examples of anthropomorphic control based on an occupant's activity status, the examples of such activity have typically not been directed as interaction with the system for control of the system (e.g., voice command and/or gestural input). The process of FIG. 7 is similar to the processes of FIGS. 5-6, however, the anthropomorphic control is responsive not only to user activity within the room or other space (e.g., entering, leaving, performing tasks, etc.) as described above, but also to user input directed as interaction with the system for control of the system (e.g., voice command and/or gestural input).

In step S112, system 10 and/or lighting device 11 controls operations of the various elements, such as light source 13, sensor(s) 31, 33, 39, motorized control 149, camera 41, projector 43, microphone 35 and/or speaker 37. In step S113, system 10 and/or lighting device 11 receives input. Such input is, for example, an activity status determined in step S115, similar to steps S92 and S104 of FIGS. 5-6. Alternatively, or in addition to, such input is, for example, a user input directed as interaction with the system for control of the system.

In one example, an occupant, via voice command, requests the system 10 and/or lighting device 11 to schedule a meeting with another individual at a particular time and day. As described above in relation to FIG. 4A, system 10 and/or lighting device 11 may utilize the information portal functionality to determine the availability of the other individual for the requested time and day. Upon determining that the other individual is unavailable at that time and day, system 10 and/or lighting device 11, based on anthropomorphic object 101, may manipulate operations of the system in step S116. In this example, system 10 and/or lighting device 11 controls light source 13 to change the color output to be red and utilizes the speaker 37 to announce "I'm sorry. The other party is unavailable at your requested time. Would you like to try another time and day?" In this way, the system 10 and/or lighting device 11 presents a "helpful" persona to the occupant in response to the user's input.

As with the processes in FIGS. 5-6, learning system 100 learns how the occupant responds to such manipulation of operations and utilizes such learning to modify the anthropomorphic object 101, in step S117, and the presentation, in step S118. For example, any time the other individual is unavailable and the occupant is given the opportunity to request another time and day, the occupant always makes such a request. Based on this learning, anthropomorphic object 101 may be modified such that, instead of asking if the occupant would like to request an alternate time, the system 10 and/or lighting device 11 determines a time and day with mutual availability for the occupant and the other party. Then, the presentation is modified such that system 10 and/or lighting device 11 controls light source 13 to change the color output to be orange and utilizes the speaker 37 to announce "The other party is unavailable at your requested time, but here is a time and day with mutual availability."

Figure 10:
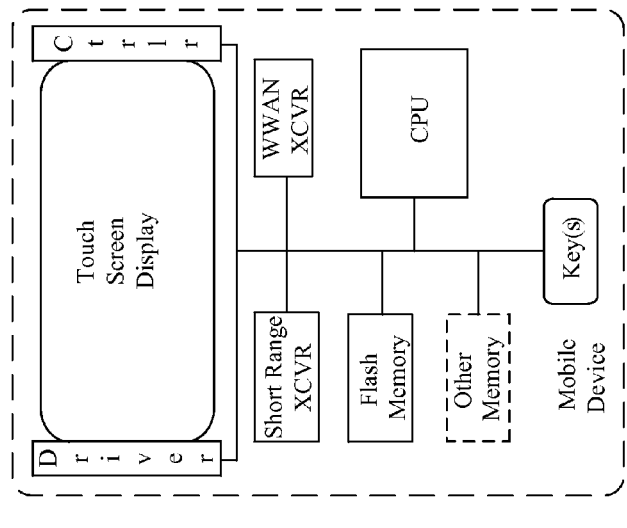
FIG. 10 is a simplified functional block diagram of a mobile device, as an alternate example of a user terminal device, for possible communication in or with the system of FIG. 4A.
Figure 9:
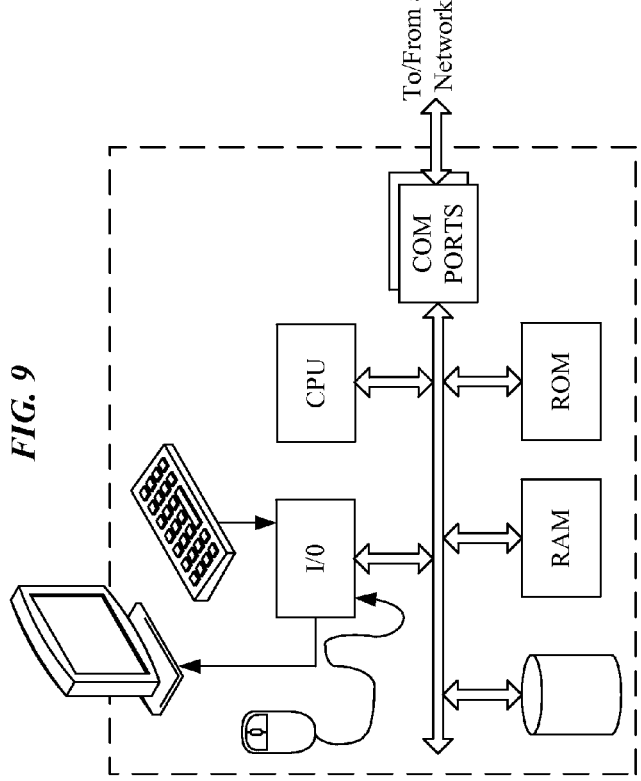
FIG. 9 is a simplified functional block diagram of a personal computer or other user terminal device, which may be used as the remote access terminal, in the system of FIG. 4A.
Figure 8:
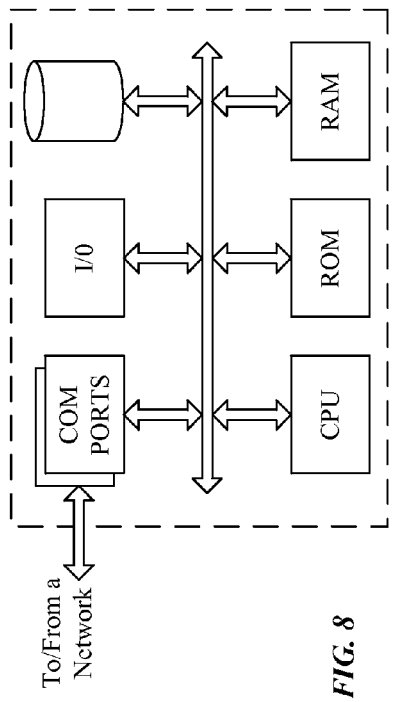
FIG. 8 is a simplified functional block diagram of a computer that may be configured as a host or server, for example, to function as an external server or a server if provided at the premises in the system of FIG. 4A.

As shown by the above discussion, at least some functions of devices associated or in communication with the networked lighting system 10 of FIG. 4A, such as elements shown at 27 and 29 (and/or similar equipment not shown but located at the premises 21), may be implemented with general purpose computers or other general purpose user terminal devices, although special purpose devices may be used. FIGS. 8-10 provide functional block diagram illustrations of exemplary general purpose hardware platforms.

FIG. 8 illustrates a network or host computer platform, as may typically be used to implement a host or server, such the computer 27. FIG. 9 depicts a computer with user interface elements, as may be used to implement a personal computer or other type of work station or terminal device, such as the terminal 29 in FIG. 4A, although the computer of FIG. 9 may also act as a server if appropriately programmed. The block diagram of a hardware platform of FIG. 10 represents an example of a mobile device, such as a tablet computer, smartphone or the like with a network interface to a wireless link, which may alternatively serve as a user terminal device like 29. It is believed that those skilled in the art are familiar with the structure, programming and general operation of such computer equipment and as a result the drawings should be self-explanatory.

A server (see e.g. FIG. 8), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 9). A mobile device (see FIG. 10) type user terminal may include similar elements, but will typically use smaller components that also require less power, to facilitate implementation in a portable form factor. The example of FIG. 10 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 8 and the terminal computer platform of FIG. 9 are shown by way of example as using a RAM type main memory and a hard disk drive for mass storage of data and programming, whereas the mobile device of FIG. 10 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 9). The mobile device example in FIG. 10 touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

Although FIGS. 8-10 in their present form show computers and user terminal devices, generally similar configurations also may be used within other elements of the lighting system 10. For example, one implementation of the brain, communication and interface elements of a lighting device may utilize an architecture similar to that of one of the computers or mobile terminals. As a more specific example, the personal computer type hardware in FIG. 9 (except for the keyboard, mouse and display) could serve as the brain and communication elements of a lighting device, where the input/output interface I/O would interface to an appropriate light driver and to any sensor(s) or other enhancement input or output device(s) included within the lighting device.

If provided on the system 10, additional system elements, such as a standalone sensor or an additional user interface device, they may be similarly implemented using an architecture like one of the devices of FIGS. 8-10. For example, an additional other user interface device (UI) might utilize an arrangement similar to the mobile device of FIG. 10, albeit possibly with only one transceiver compatible with the networking technology of the particular premises (e.g. to reduce costs).

As also outlined above, aspects of the interactive user interface and any associated anthropomorphic control and/or learning techniques of the lighting devices 11 may be embodied in programming of the appropriate system elements, particularly for the processors of intelligent lighting devices 11. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming and/or associated data such as the anthropomorphic object(s) may at times be communicated through the Internet or various other telecommunication networks. Such communications, for example, may enable loading of the programming and/or data from one computer or processor into another, for example, from a management server or host computer of the lighting system service provider (e.g. implemented like the server computer shown at 27) into any of the lighting devices, etc. of or coupled to the system 10 at the premises 21, including programming for individual element functions, programming for user interface functions and programming for distributed processing functions. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
   a processor;
   a source of light, the source of light being configured to output visible light in a manner permitting control of a plurality of parameters of the visible light output, responsive to control by the processor;
   at least one other controllable feature configured to provide a humanly perceptible output, responsive to control by the processor;
   a sensor configured to detect a condition in a space illuminated by the system, the condition relating to an activity of an occupant when within the space, and to provide a condition responsive input to the processor;
   a storage device accessible by the processor;
   an anthropomorphic object related to a persona; and
   a program in the storage device, wherein execution of the program by the processor configures the system to implement functions, including functions to:
     control operation of the light source to illuminate the space while the occupant is in the space, including control of at least one of the plurality of parameters of the visible light output;
     control operation of the at least one other controllable feature;
     process the condition responsive signal from the sensor to determine an activity status of the occupant while in the space; and
     manipulate the control functions responsive to the determined activity status based on the anthropomorphic object, in such a manner that the light output and operation of the at least one other controllable feature together provide a presentation for the occupant as a perceptible instance of the persona.

2. The system of claim 1, wherein the program includes a learning module configured to cause the processor to:
   implement the manipulation of the control functions based upon previously determined activity statuses in response to previously implemented manipulation of the control functions; and
   modify the anthropomorphic object based upon the determined activity status and previously determined activity statuses in response to previously implemented manipulation of the control functions.

3. The system of claim 1, wherein the anthropomorphic object comprises persona defining data, including at least one of:

information related to movement;
information related to sound;
information related to at least one lighting parameter;
information related to physical shape; and
information related to a personality.

4. The system of claim 3, wherein the presentation for the occupant as a perceptible instance of the persona includes at least one of:
movement;
sound;
manipulation of at least one lighting parameter;
manipulation of physical shape;
power control; and
local or remote message output personalized in accordance with the anthropomorphic object.

5. The system of claim 4, wherein the program includes a learning module configured to cause the processor to:
implement the manipulation of the control functions based upon previously determined activity statuses in response to previously implemented manipulation of the control functions;
modify the anthropomorphic object based upon the determined activity status and previously determined activity statuses in response to previously implemented manipulation of the control functions; and
modify the presentation based upon previously determined activity statuses in response to previous presentations.

6. The system of claim 5, wherein the learning module is further configured to cause the processor to:
further modify the anthropomorphic object based upon previously determined activity statuses in response to previous presentations; and
further modify the presentation based upon previously determined activity statuses in response to previously implemented manipulation of the control functions.

7. The system of claim 1, wherein the sensor is configured to detect, as the condition, one or more conditions selected from the group consisting of:
an image of the space;
audio within the space;
motion of the occupant within the space; and
light from the occupant within the space.

8. A system, comprising:
a processor;
a source of light, the source of light being configured to output visible light in a manner permitting control of a plurality of parameters of the visible light output, responsive to control by the processor;
at least one other controllable feature configured to provide a humanly perceptible output, responsive to control by the processor;
a sensor configured to detect a condition in a space illuminated by the system, the condition relating to an activity of an occupant when within the space, and to provide a condition responsive input to the processor;
a storage device accessible by the processor;
an anthropomorphic object related to a persona; and
a program in the storage device, wherein execution of the program by the processor configures the system to implement functions, including functions to:
identify the occupant;
retrieve a profile of the identified occupant, the profile including modifications to the anthropomorphic object corresponding to the identified occupant;
control operation of the light source to illuminate the space while the occupant is in the space, including control of at least one of the plurality of parameters of the visible light output;
control operation of the at least one other controllable feature;
process the condition responsive signal from the sensor to determine an activity status of the identified occupant while in the space; and
manipulate the control functions responsive to the determined activity status based on the modified anthropomorphic object, in such a manner that the light output and operation of the at least one other controllable feature together provide a presentation for the occupant as a perceptible instance of the persona.

9. The system of claim 8, wherein the program includes a learning module configured to cause the processor to:
implement the manipulation of the control functions based upon previously determined activity statuses of the identified occupant in response to previously implemented manipulation of the control functions; and
based upon the determined activity status of the identified occupant and previously determined activity statuses of the identified occupant in response to previously implemented manipulation of the control functions, modify the profile of the identified occupant and further modify the modified anthropomorphic object.

10. The system of claim 8, wherein the anthropomorphic object comprises persona defining data, including at least one of:
information related to movement;
information related to sound;
information related to at least one lighting parameter;
information related to physical shape; and
information related to a personality.

11. The system of claim 10, wherein the presentation for the occupant as a perceptible instance of the persona includes at least one of:
movement;
sound;
manipulation of at least one lighting parameter;
manipulation of physical shape;
power control; and
local or remote message output personalized in accordance with the anthropomorphic object.

12. The system of claim 11, wherein the program includes a learning module configured to cause the processor to:
implement the manipulation of the control functions based upon previously determined activity statuses of the identified occupant in response to previously implemented manipulation of the control functions;
based upon the determined activity status of the identified occupant and previously determined activity statuses of the identified occupant in response to previously implemented manipulation of the control functions, modify the profile of the identified occupant and further modify the modified anthropomorphic object; and
modify the presentation based upon previously determined activity statuses of the identified occupant in response to previous presentations.

13. The system of claim 12, wherein the learning module is further configured to cause the processor to:
based upon previously determined activity statuses of the identified occupant in response to previous presentations, modify the profile of the identified occupant and further modify the modified anthropomorphic object; and based upon previously determined activity statuses of the identified occupant in response to previously implemented manipulation of the control functions, further modify the presentation.

14. The system of claim 8, wherein the sensor is configured to detect, as the condition, one or more conditions selected from the group consisting of:
an image of the space;
audio within the space;
motion of the occupant within the space; and
light from the occupant within the space.

15. The system of claim 8, further comprising a data communication interface, controlled by the processor, configured for communication of data from and to the system over a network,
wherein further execution of the program by the processor further configures the system to implement further functions, including functions to:
access information about the identified occupant from an on-line service, via communication over the network, to determine a status of the identified occupant for the on-line service; and
manipulate the control functions responsive to the determined on-line status of the identified occupant based on the modified anthropomorphic object, in such a manner that the light output and operation of the at least one other controllable feature together provide a presentation for the occupant as a perceptible instance of the persona.

16. The system of claim 15, wherein further execution of the program by the processor further configures the system to implement further functions, including functions to:
manipulate the control functions responsive to the determined activity status of the identified occupant and the determined on-line status of the identified occupant based on the modified anthropomorphic object, in such a manner that the light output and operation of the at least one other controllable feature together provide a presentation for the occupant as a perceptible instance of the persona.

17. The system of claim 16, wherein the program includes a learning module configured to cause the processor to:
implement the manipulation of the control functions based upon previously determined on-line statuses of the identified occupant and previously determined activity statuses of the identified occupant in response to previously implemented manipulation of the control functions;
based upon the determined on-line status of the identified occupant, the determined activity status of the identified occupant, previously determined on-line statuses of the identified occupant and previously determined activity statuses of the identified occupant in response to previously implemented manipulation of the control functions, modify the profile of the identified occupant and further modify the modified anthropomorphic object; and
based upon previously determined on-line statuses of the identified occupant and previously determined activity statuses of the identified occupant in response to previous presentations, modify the presentation.

18. A system, comprising:
a processor;
a source of light, the source of light being configured to output visible light in a manner permitting control of a plurality of parameters of the visible light output, responsive to control by the processor;
at least one other controllable feature configured to provide a humanly perceptible output, responsive to control by the processor;
a sensor configured to detect a condition in a space illuminated by the system, the condition relating to an activity of an occupant when within the space, and to provide a condition responsive input to the processor;
a user input element, for providing user input for processing to the processor;
a storage device accessible by the processor;
an anthropomorphic object related to a persona; and
a program in the storage device, wherein execution of the program by the processor configures the system to implement functions, including functions to:
control operation of the light source to illuminate the space while the occupant is in the space, including control of at least one of the plurality of parameters of the visible light output;
control operation of the at least one other controllable feature;
while controlling operation of the light source and the at least one other controllable feature, receive an input from at least one of:
the occupant representing a desired change of at least one of the parameters of the visible light output via the user input element; and
the sensor representing an activity status of the occupant while in the space based upon the condition responsive input to the processor; and
manipulate the control functions responsive to the received input based on the anthropomorphic object, in such a manner that the light output and operation of the at least one other controllable feature together provide a presentation for the occupant as a perceptible instance of the persona.

19. The system of claim 18, wherein the anthropomorphic object comprises persona defining data, including at least one of:
information related to movement;
information related to sound;
information related to at least one lighting parameter;
information related to physical shape; and
information related to a personality.

20. The system of claim 19, wherein the presentation for the occupant as a perceptible instance of the persona includes at least one of:
movement;
sound;
manipulation of at least one lighting parameter;
manipulation of physical shape;
power control; and
local or remote message output personalized in accordance with the anthropomorphic object.

21. The system of claim 20, wherein the program includes a learning module configured to cause the processor to:
implement the manipulation of the control functions based upon previously received input in response to previously implemented manipulation of the control functions;
modify the anthropomorphic object based upon the received input and previously received inputs in response to previously implemented manipulation of the control functions; and
modify the presentation based upon previously received inputs in response to previous presentations.

22. The system of claim 21, wherein the learning module is further configured to cause the processor to:

further modify the anthropomorphic object based upon previously received inputs in response to previous presentations; and further modify the presentation based upon previously received inputs in response to previously implemented manipulation of the control functions.

23. The system of claim 18, wherein the sensor is configured to detect, as the condition, one or more conditions selected from the group consisting of:

an image of the space;
audio within the space;
motion of the occupant within the space; and
light from the occupant within the space.

* * * * *